United States Patent
Otomo et al.

(10) Patent No.: US 9,729,626 B2
(45) Date of Patent: Aug. 8, 2017

(54) FILE SHARING METHOD AND TERMINAL

(71) Applicant: FUJITSU LIMITED, Kawasaki (JP)

(72) Inventors: Toshiya Otomo, Kawasaki (JP);
Koichiro Yamashita, Hachioji (JP);
Takahisa Suzuki, Kawasaki (JP);
Hiromasa Yamauchi, Kawasaki (JP);
Koji Kurihara, Kawasaki (JP); Naoki Odate, Akiruno (JP); Tetsuo Hiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 14/026,481

(22) Filed: Sep. 13, 2013

(65) Prior Publication Data
US 2014/0012921 A1    Jan. 9, 2014

Related U.S. Application Data

(63) Continuation of application No. PCT/JP2011/056113, filed on Mar. 15, 2011.

(51) Int. Cl.
*G06F 15/16*    (2006.01)
*H04L 29/08*    (2006.01)
*G06F 17/30*    (2006.01)
*G06F 9/50*     (2006.01)

(52) U.S. Cl.
CPC .......... *H04L 67/104* (2013.01); *G06F 9/5094* (2013.01); *G06F 17/30115* (2013.01); *G06F 17/30165* (2013.01); *H04L 67/04* (2013.01); *H04L 67/06* (2013.01); *H04L 67/10* (2013.01); *Y02B 60/142* (2013.01)

(58) Field of Classification Search
CPC ....... H04L 67/104; H04L 67/06; H04L 67/04; H04L 67/10; G06F 9/5094; G06F 17/30165; G06F 17/30115; Y02B 60/142
See application file for complete search history.

(56) References Cited

U.S. PATENT DOCUMENTS

| | | | |
|---|---|---|---|
| 2003/0204571 A1* | 10/2003 | Waltermann | 709/214 |
| 2005/0216473 A1 | 9/2005 | Aoyagi et al. | |
| 2011/0010455 A1* | 1/2011 | Wolfe et al. | 709/226 |

FOREIGN PATENT DOCUMENTS

| | | |
|---|---|---|
| JP | 2005-92288 | 4/2005 |
| JP | 2005-275937 | 10/2005 |
| JP | 2007-158478 | 6/2007 |
| JP | 2009-122981 | 6/2009 |
| JP | 2010-157016 | 7/2010 |

(Continued)

OTHER PUBLICATIONS

Lu et al., "Peer group construction strategy for task allocation on P2P-Grid Environment", IEICE Technical Report, vol. 108, No. 359, Dec. 11, 2008, pp. 19-22 and cover page.

(Continued)

*Primary Examiner* — Padma Mundur
(74) *Attorney, Agent, or Firm* — Staas & Halsey LLP

(57) ABSTRACT

A file sharing method executed by a first terminal, and including selecting from among multiple terminals including the first terminal and based on a remaining battery level of the terminals and a processing time of a shared process, a second terminal to execute the shared process for sharing multiple files among the terminals; and assigning the shared process to the second terminal.

10 Claims, 19 Drawing Sheets

(56) References Cited

FOREIGN PATENT DOCUMENTS

JP          2010-277517      12/2010
WO    WO 2010043400 A2 *    4/2010   ............. H04L 29/06

OTHER PUBLICATIONS

Ueda et al., "IP Network Adaptive P2P Network Topology Control", Journal of IEICE, vol. J92-B, No. 11, Nov. 1, 2009, pp. 1750-1763.
International Search Report mailed May 24, 2011 in corresponding International Application No. PCT/JP2011/056113.
Japanese Office Action mailed Mar. 4, 2014 in corresponding Japanese Application No. 2013-504447.
Japanese International Preliminary Report on Patentability mailed Sep. 26, 2013 in corresponding International Patent Application No. PCT/JP2011/056113.

* cited by examiner

FIG.6

FILE SHARING GROUP DB 600

| T | Q (MB/s) | N | $S_{w1}$ (MB/s) | $S_{w2}$ (MB/s) | ... | B (%) | tn (MB/s) | tf (MB/s) | Write (ms/MB) |
|---|---|---|---|---|---|---|---|---|---|
| X | 50 | 1 | 10 | - | ... | 80 | - | - | 83 |
| Y | 150 | 2 | 20 | 15 | ... | 75 | 10 | 15 | 76 |
| Z | 100 | 2 | 10 | 20 | ... | 90 | 20 | 20 | 53 |

601-1
601-2
601-3

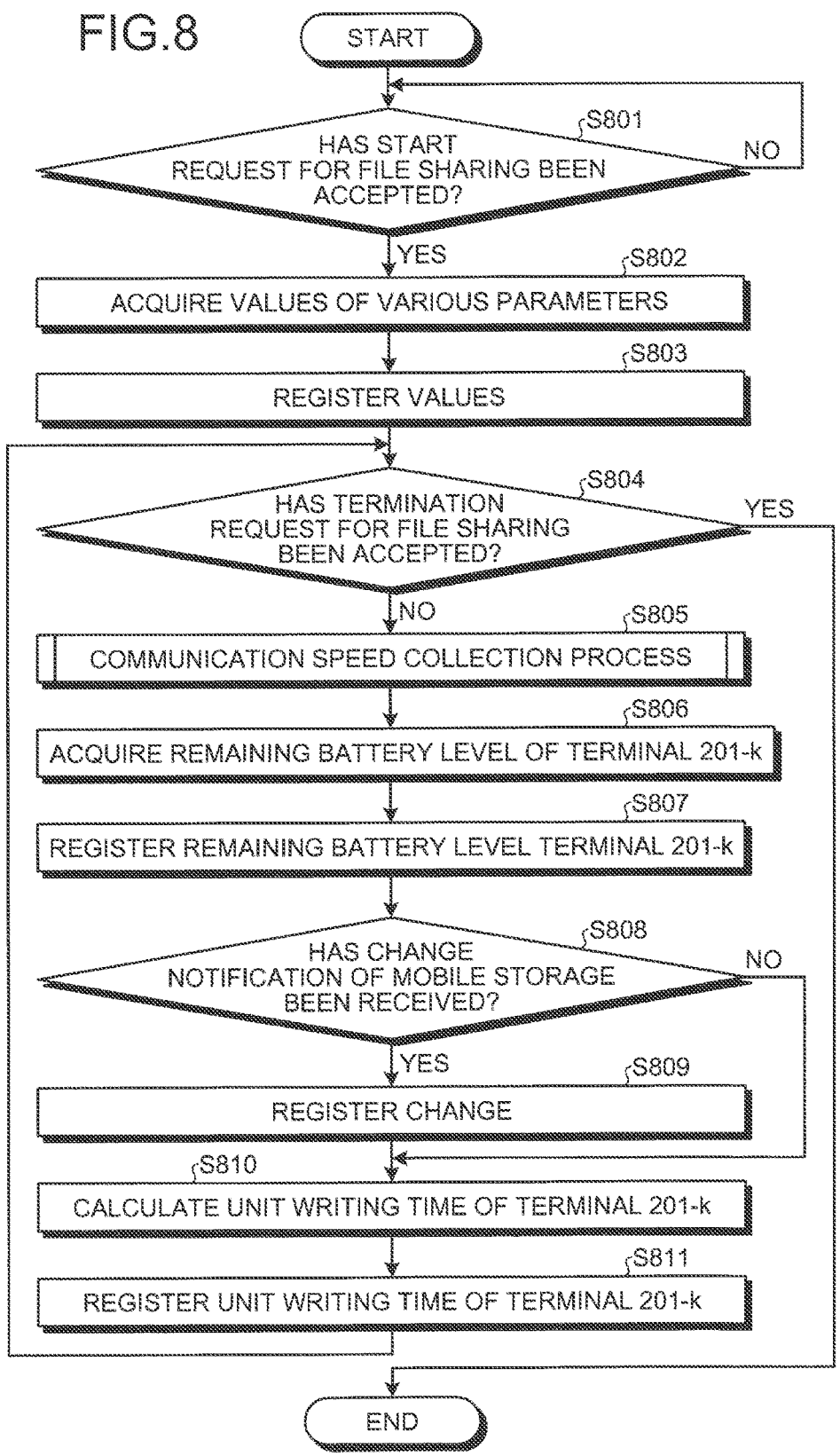

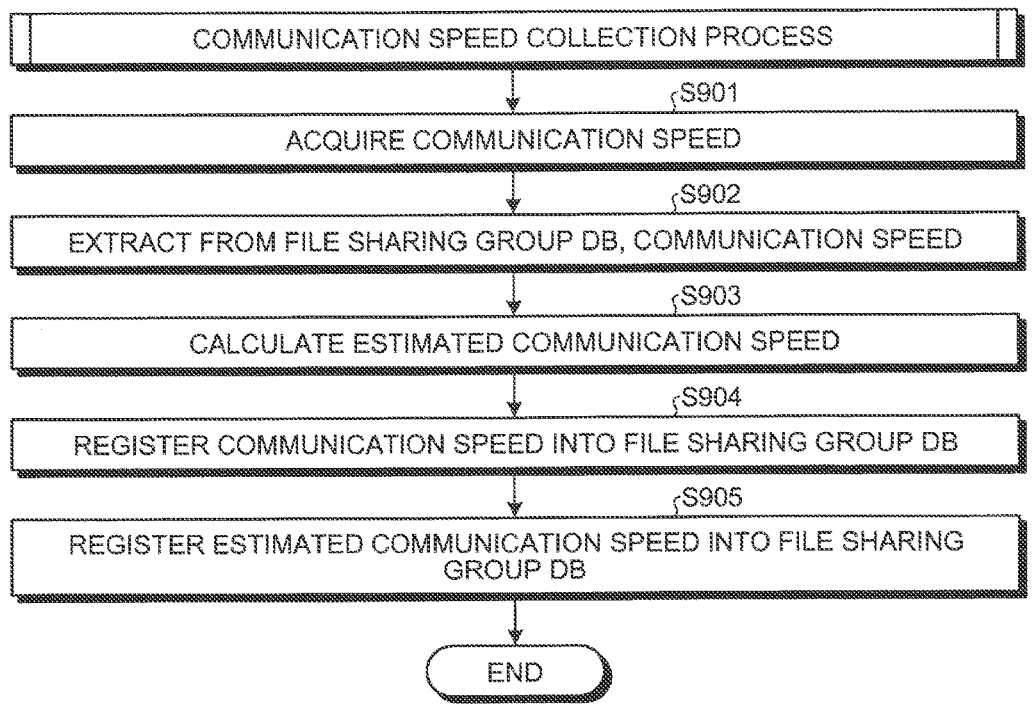

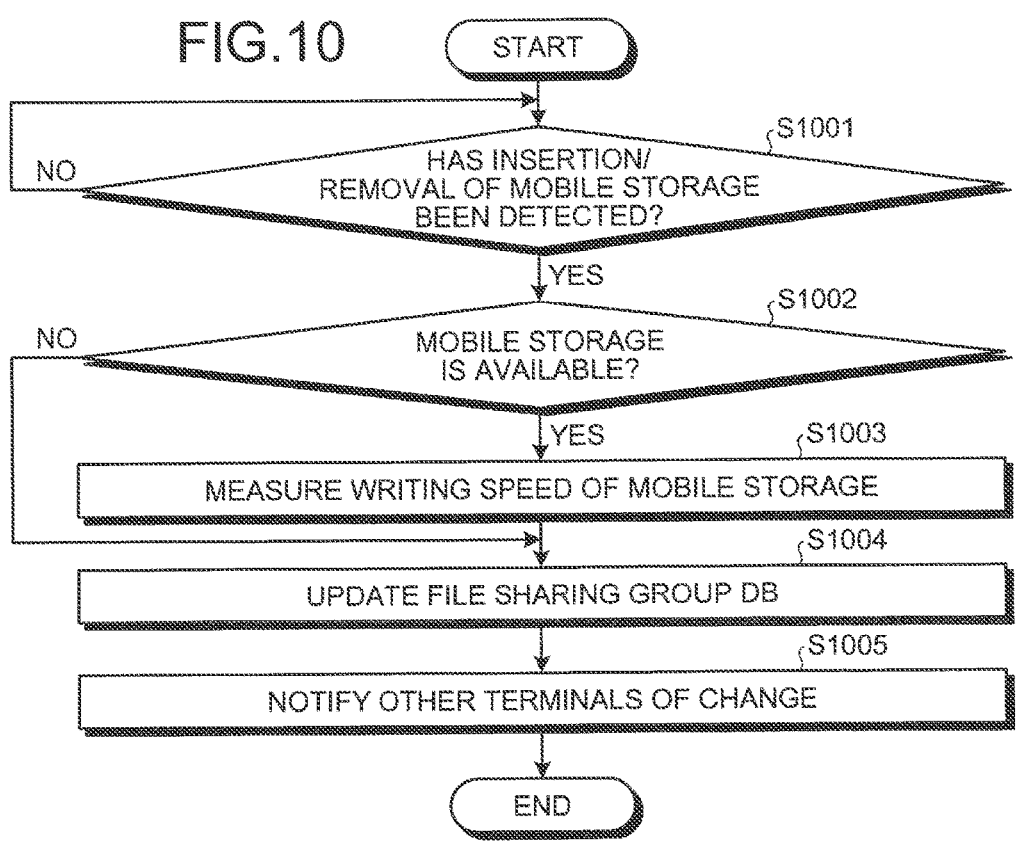

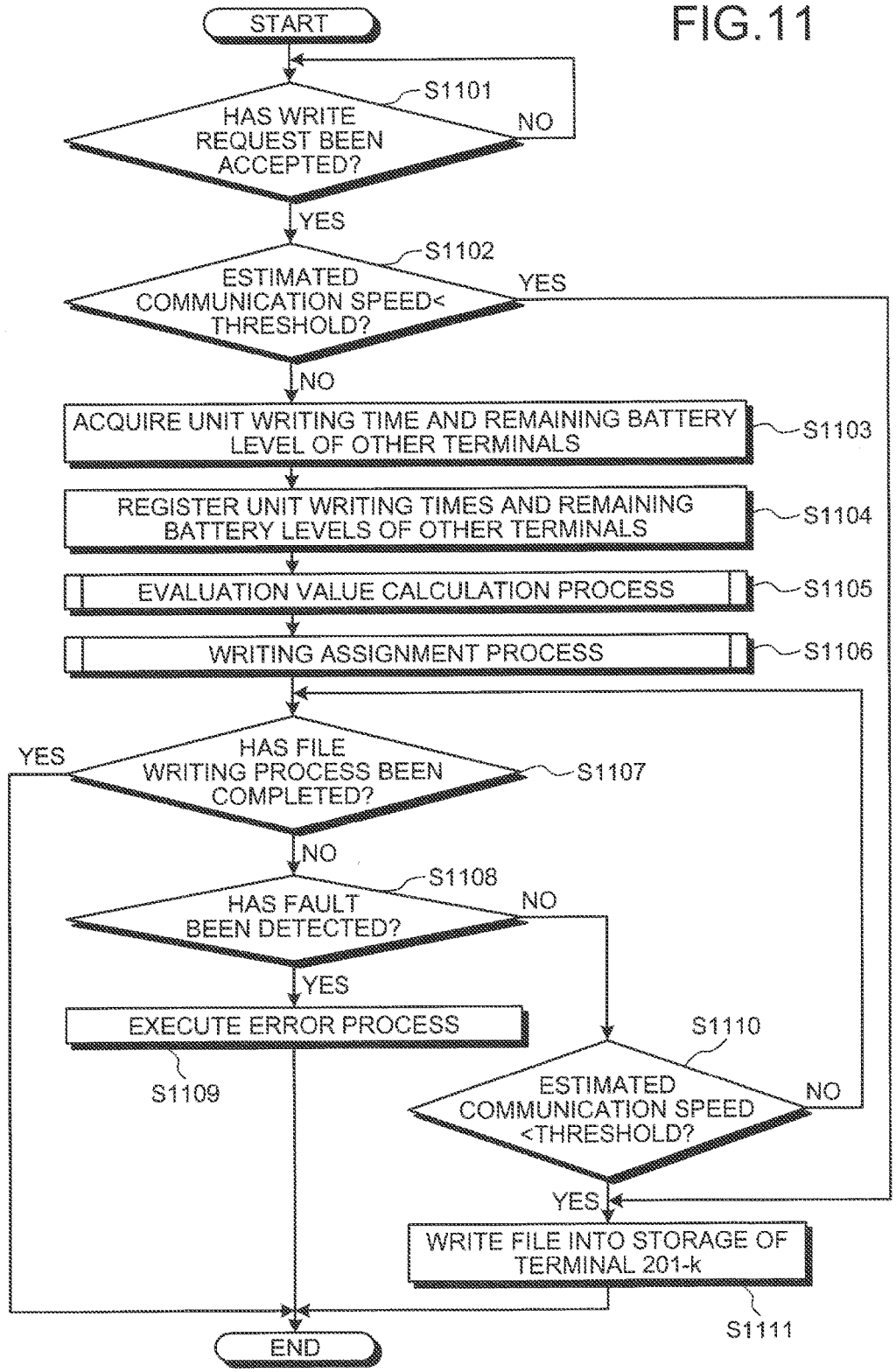

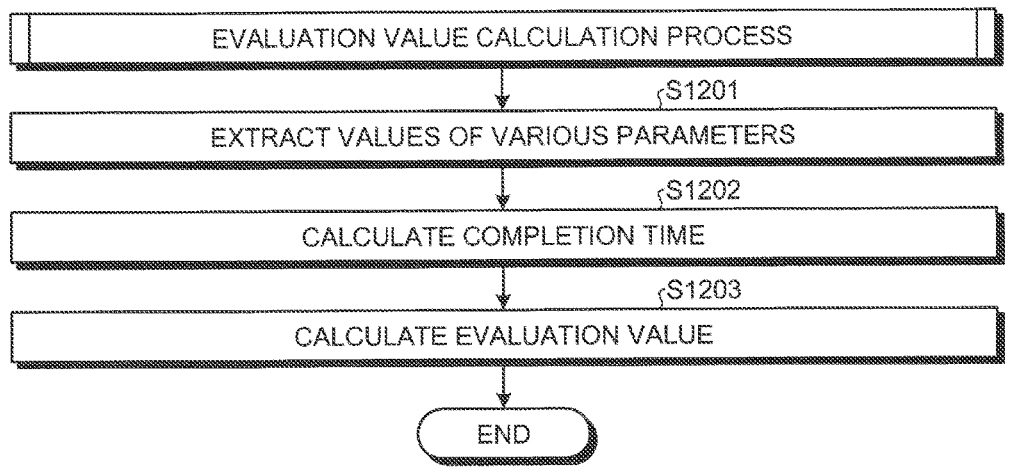
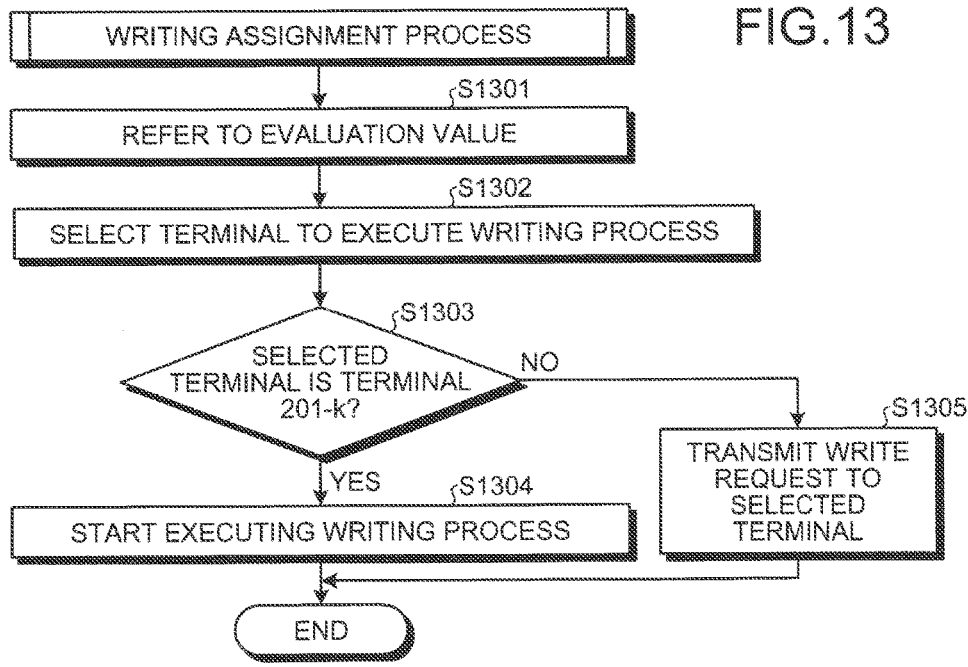

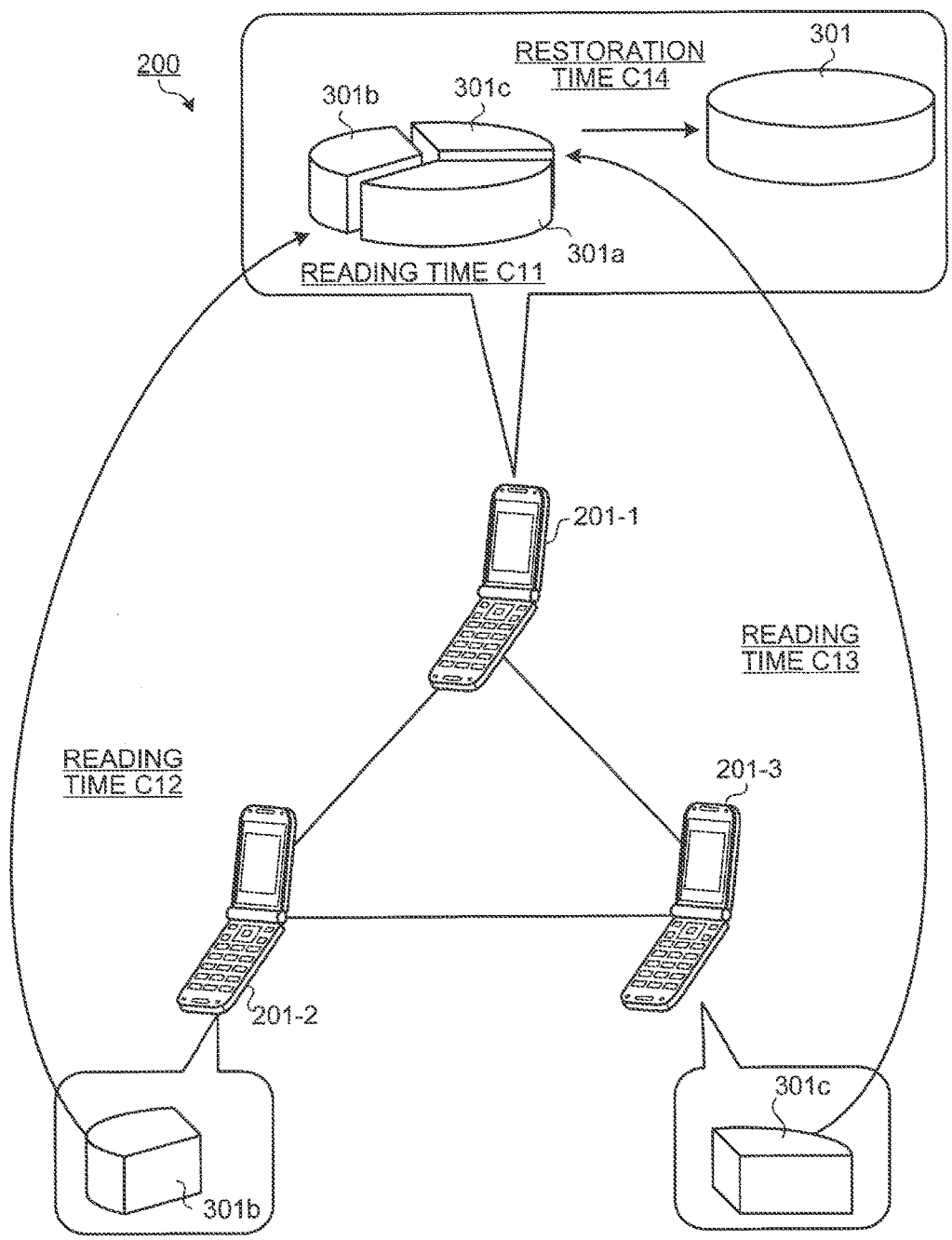

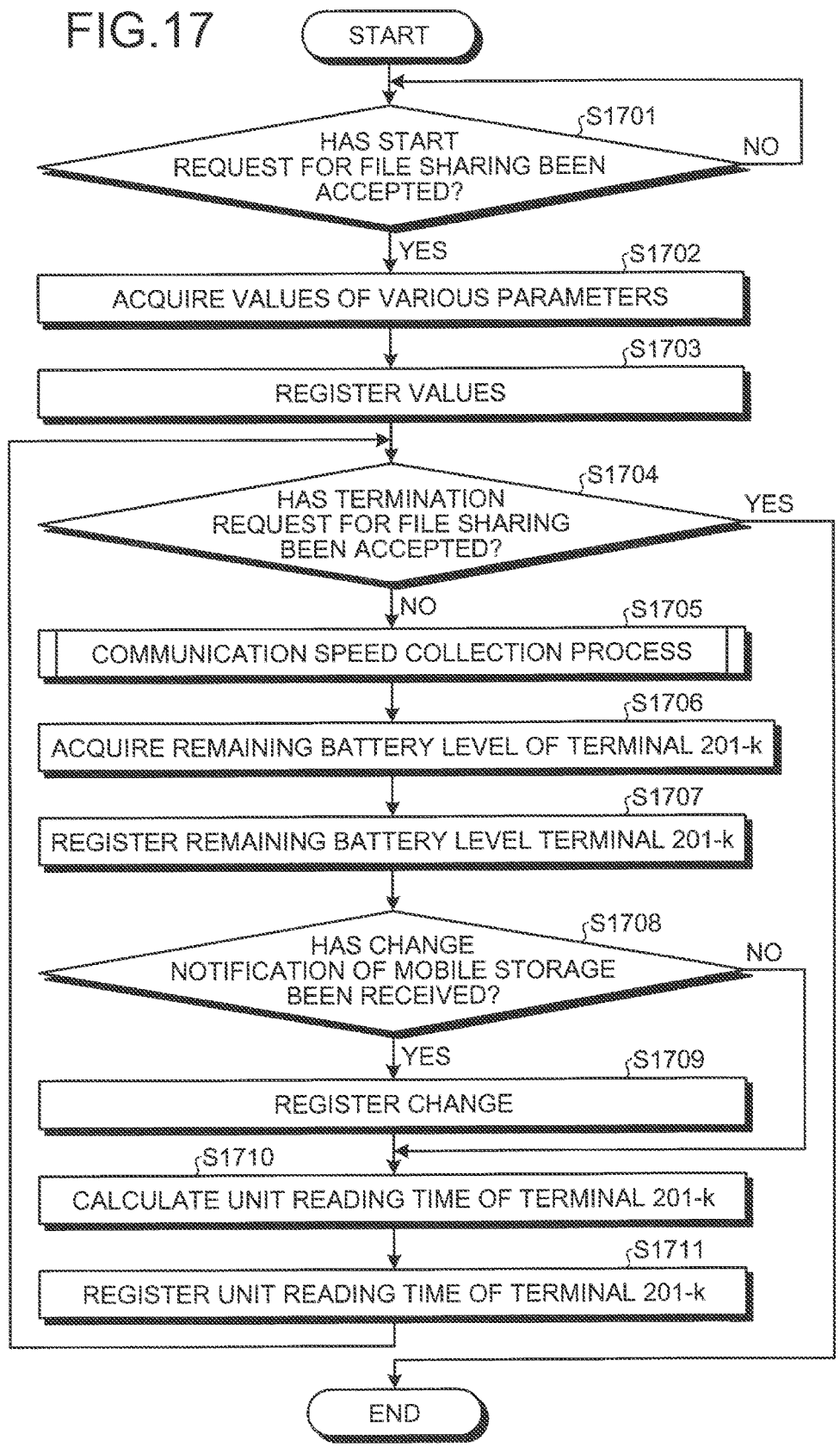

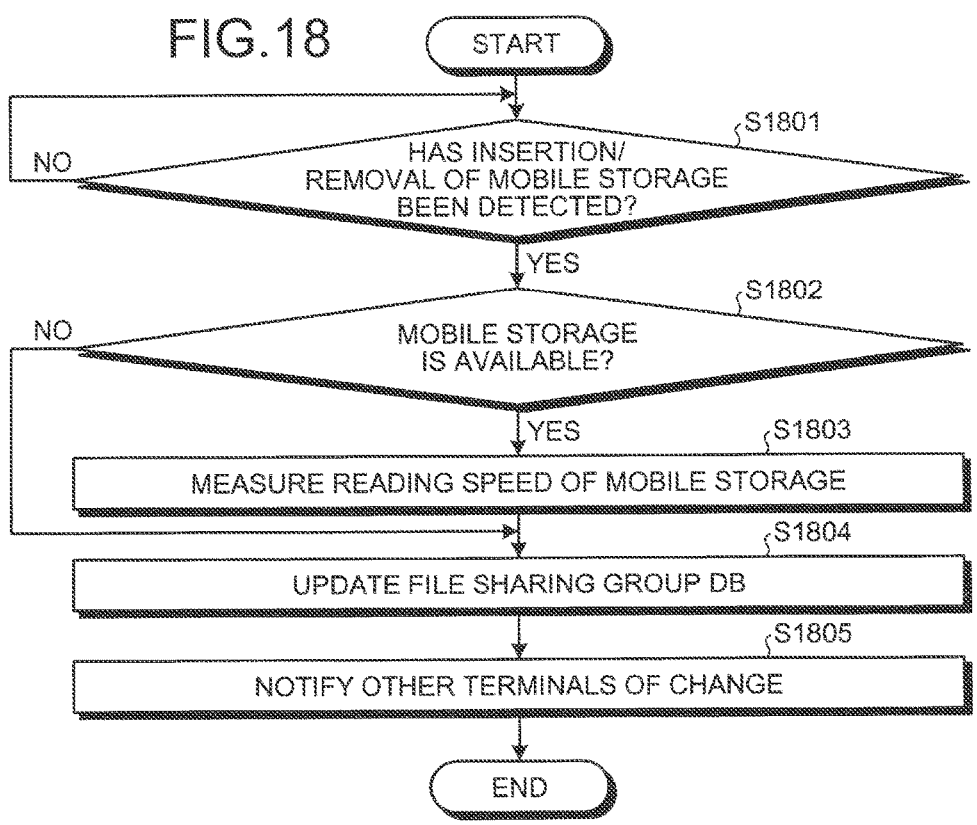

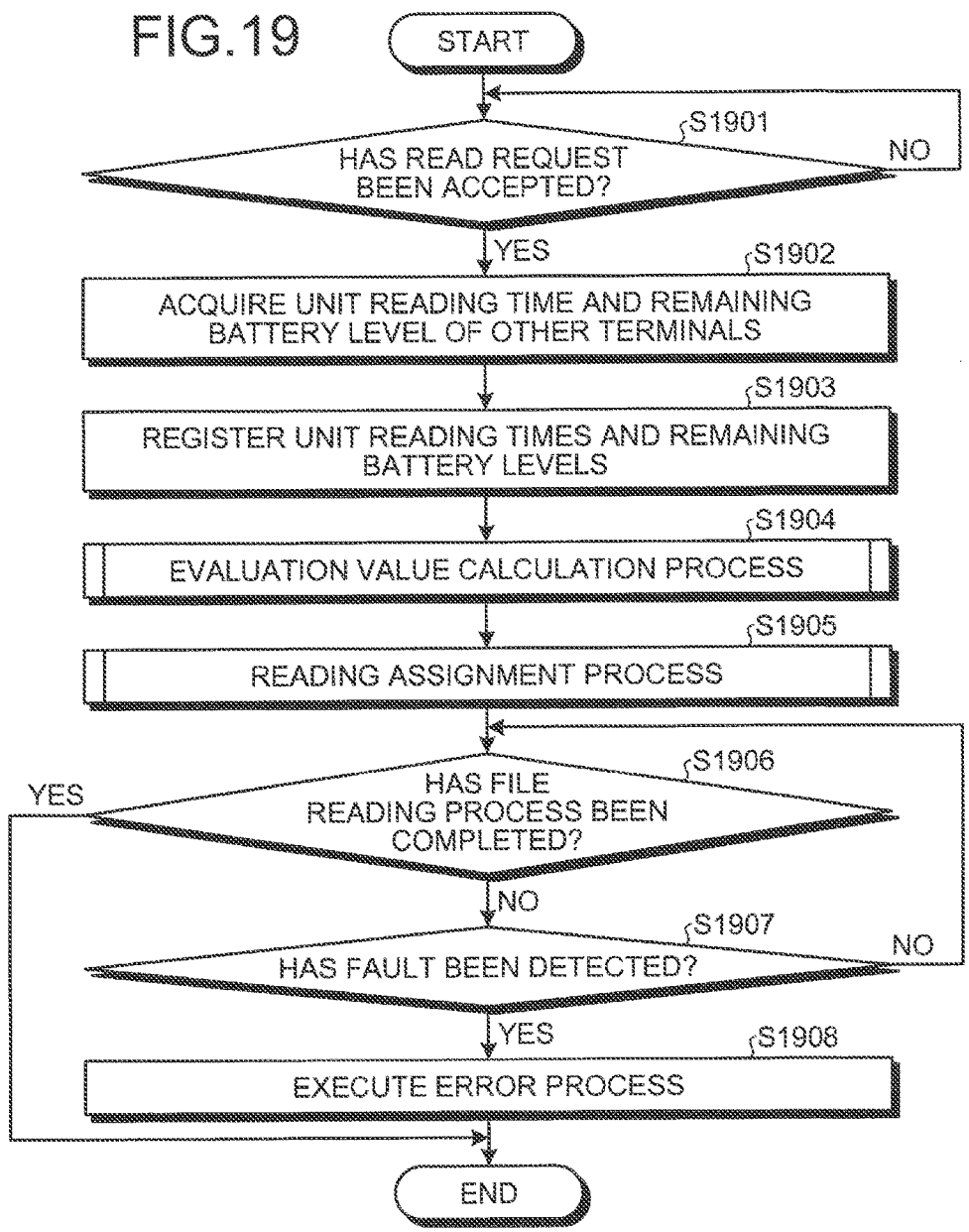

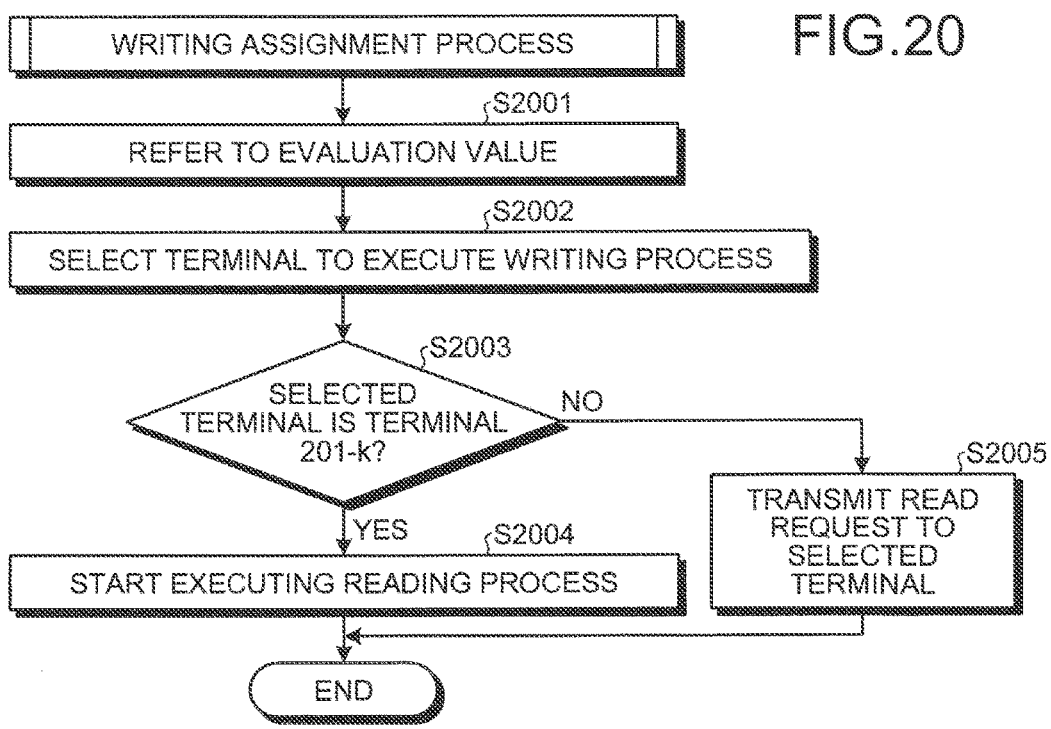

FILE SHARING METHOD AND TERMINAL

CROSS REFERENCE TO RELATED APPLICATIONS

This application is a continuation application of International Application PCT/JP2011/056113, filed on Mar. 15, 2011 and designating the U.S., the entire contents of which are incorporated herein by reference.

FIELD

The embodiments discussed herein are related to a file sharing method and terminal that share files.

BACKGROUND

Techniques of sharing files among multiple terminals have been disclosed. For example, a peer-to-peer (P2P) type file sharing system stores division data divided from a file in multiple terminals. The file sharing system distributes the division data of the file in multiple terminals, thereby ensuring confidentiality of the file against unauthorized access and enabling the sharing of a file of a data size greater than the storage capacity of a single terminal.

The terminals accept a process request for a shared process of a file from a user and execute the shared process corresponding to the process request. The process request may be, for example, a read request for a file and a write request for a file. For example, the shared process is a writing process of distributing to terminals, multiple division data obtained by dividing a file and a reading process of collecting the division data stored in the terminals to restore a file. For examples of such techniques, refer to Japanese Laid-Open Patent Publication Nos. 2005-275937 and 2005-92288.

Nonetheless, a conventional technique has a problem in that the time consumed until completion of the shared process of a file may increase.

For example, if a terminal with insufficient battery charge accepts a process request from a user, the battery may run out before completion of a shared process and the shared process may be interrupted. In this case, for example, the shared process is resumed after the battery is charged or replaced, which increases the time until completion of the shared process.

For example, if a terminal with a processing speed that is slower than the other terminals accepts a process request from a user, the processing time until completion of the shared process may become longer than the processing time at the other terminals.

SUMMARY

According to an aspect of an embodiment, a file sharing method executed by a first terminal includes selecting from among multiple terminals including the first terminal and based on a remaining battery level of the terminals and a processing time of a shared process, a second terminal to execute the shared process for sharing multiple files among the terminals; and assigning the shared process to the second terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory view of an example of the contents of a file sharing group DB;

FIG. 8 is a flowchart of an example of a procedure of a file sharing setting process of the terminal according to the second embodiment;

FIG. 9 is a flowchart of an example of a procedure of a communication speed collection process of the terminal according to the second embodiment;

FIG. 10 is a flowchart of an example of a procedure of a storage insertion/removal detection process of the terminal according to the second embodiment;

FIG. 11 is a flowchart of an example of a procedure of a write request acceptance process of the terminal according to the second embodiment;

FIG. 12 is a flowchart of an example of a procedure of an evaluation value calculation process of the terminal according to the second embodiment;

FIG. 13 is a flowchart of an example of a procedure of a writing assignment process of the terminal according to the second embodiment;

FIGS. 14 and 15 are explanatory views of a calculation example of the completion time of the file reading process of a file to be shared;

FIG. 17 is a flowchart of an example of a procedure of the file sharing setting process of the terminal according to a third embodiment;

FIG. 18 is a flowchart of an example of a procedure of the storage insertion/removal detection process of the terminal according to the third embodiment;

FIG. 19 is a flowchart of an example of a read request acceptance process procedure of the terminal according to the third embodiment; and FIG. 20 is a flowchart of an example of a procedure of a reading assignment process of the terminal according to the third embodiment.

DESCRIPTION OF EMBODIMENTS

Embodiments of a file sharing method and a terminal will be described with reference to the accompanying drawings.

Figure 1:
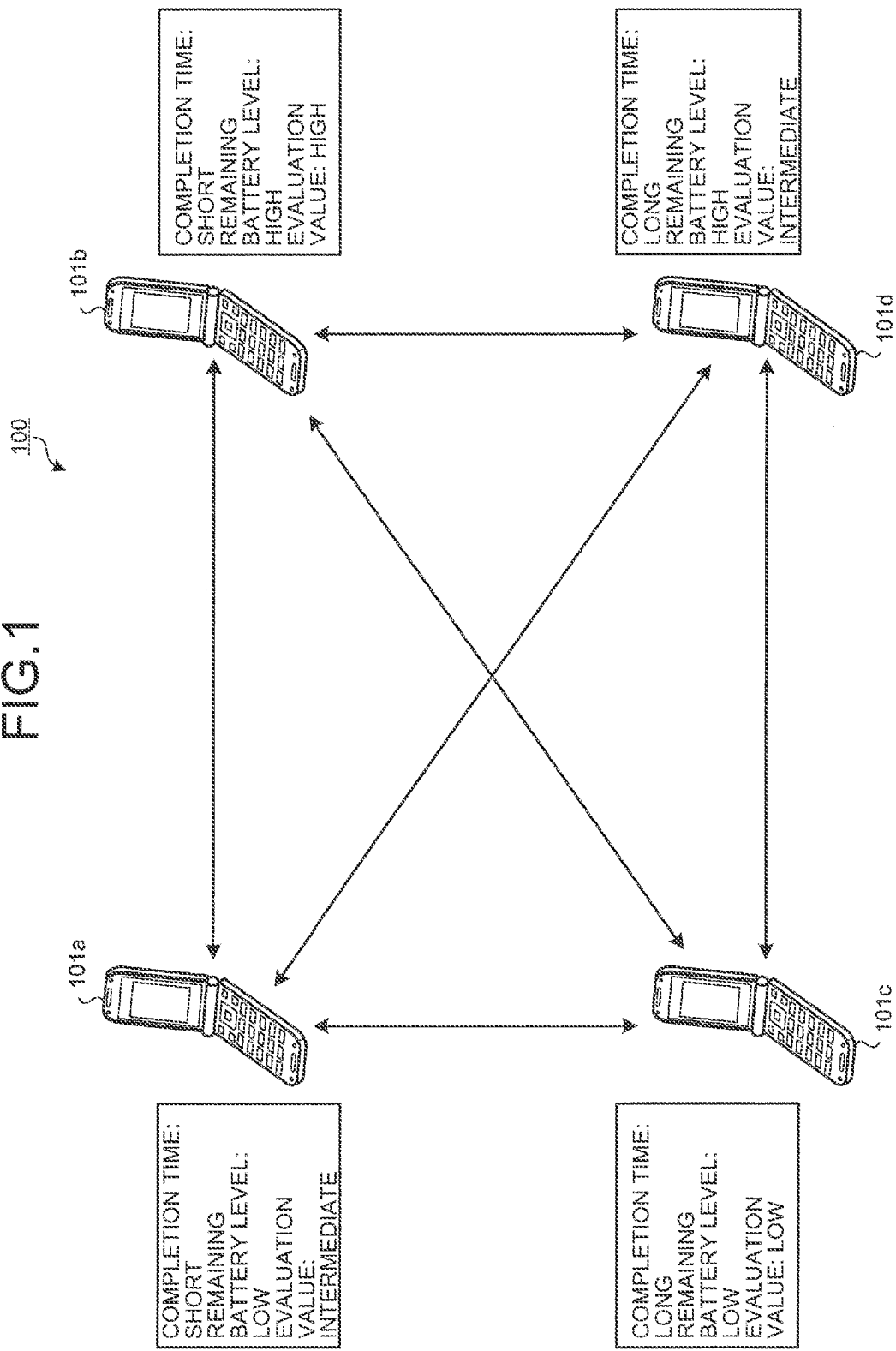
FIG. 1 is an explanatory view of an example of a file sharing method according to a first embodiment.

An example of a file sharing method according to a first embodiment will be described. FIG. 1 is an explanatory view of an example of the file sharing method according to the first embodiment. In FIG. 1, a file sharing system 100 includes terminals 101a to 101d.

In the file sharing system 100, the terminals 101a to 101d share a file. The terminals 101a to 101d are mobile terminals, personal digital assistants (PDAs), and notebook-sized personal computers (PCs), for example. The file to be shared is an image file such as a picture and a moving image shared among multiple users, for example.

When accepting a process request for a shared process of a file from a user, a terminal to execute the shared process with respect to the file is selected from among the terminals 101a to 101d and the shared process of the file is assigned to the terminal. The shared process of the file is a process for sharing the file among multiple terminals. The shared process includes a writing process and a file reading process, for example.

The higher the processing ability of the terminal that is to execute the shared process is, the shorter the completion time is for completing the shared process. On the other hand, the lower the processing ability of the terminal is, the longer the completion time is for completing the shared process. If the battery becomes exhausted at the terminal during execution of the shared process of the file, the interruption and resumption of the shared process increases the time from acceptance of the process request for the shared process from a user until the shared process is completed.

Accordingly, in the first embodiment, the terminals calculate an evaluation value of each terminal in consideration of the completion time of the shared process of each of the terminals 101a to 101d and the remaining battery level of each terminal. The evaluation value is used as an index for selecting a terminal to which a shared process of a file is to be assigned.

The completion time is the time from acceptance of a process request for a shared process from a user until the shared process is completed. However, the completion time is a time based on the premise that the shared process is not interrupted due to exhaustion of the battery etc., during execution of the shared process. The completion time is calculated from the processing speed of the central processing unit (CPU) of each terminal, the communication speed between terminals, etc. In the example of FIG. 1, the terminals 101c and 101d have a completion time "long", which means that the completion time is longer than the terminals 101a and 101b having a completion time "short".

The remaining battery level is the remaining power level of a battery supplying electricity to a terminal. For example, the remaining battery level is represented by the remaining amount of the battery or a ratio of the remaining amount relative to the chargeable electric capacity of the battery. In the example of FIG. 1, the terminals 101b and 101d have remaining battery levels "high", which means that the remaining battery levels are higher than those of the terminals 101a and 101c having remaining battery levels "low".

In this example, the evaluation value becomes higher when the completion times of the terminals is shorter and becomes higher when the remaining battery levels of the terminals is higher. The terminals select a terminal having a higher evaluation value from among the terminals 101a to 101d and assign the shared process for the file to the terminal. An example of assigning the shared process will be described on the assumption that the terminal 101a accepts a process request for the shared process of the file.

When accepting a process request for the shared process of the file from a user, the terminal 101a calculates the evaluation values of the terminals. In the example of FIG. 1, "intermediate" is calculated as the evaluation value of the terminal 101a having the completion time "short" and the remaining battery level "low". "High" is calculated as the evaluation value of the terminal 101b having the completion time "short" and the remaining battery level "high". "Low" is calculated as the evaluation value of the terminal 101c having the completion time "long" and the remaining battery level "low". "Intermediate" is calculated as the evaluation value of the terminal 101d having the completion time "long" and the remaining battery level "high".

The terminals 101a and 101d have the evaluation value "intermediate", which means that the terminals 101a and 101d should be recommended at a lower degree as the terminal to execute the file shared process of the file as compared to the terminal 101b having the evaluation value "high". The terminals 101a and 101d have the evaluation value "intermediate", which means that the terminals 101a and 101d should be recommended at a higher degree as the terminal to execute the file shared process of the file as compared to the terminal 101c having the evaluation value "low".

In this case, the terminal 101a selects the terminal 101b having the highest evaluation value among the terminals 101a to 101d and assigns the shared process to the terminal 101b. As a result, the shared process of the file is executed by the terminal 101b.

With the file sharing method according to the first embodiment described above, the terminal to be assigned the shared process can be selected based on the remaining battery level and the completion time of the shared process of the terminals sharing the file. As a result, a terminal having the lowest probability of running among battery power during execution of the shared process and having the shortest possible completion time for completing the shared process can be selected as the terminal to be assigned the shared process. As a result, the battery can be prevented from running out during execution of the shared process and the processing time of the shared process can be reduced.

A file sharing system according to a second embodiment will be described. The second embodiment will be described by taking, as an example, the case of executing a file writing process as the shared process of the file to be shared. The file writing process is a process of dividing the file into multiple division data and distributing the division data among multiple terminals. Portions identical to those described in the first embodiment will not be described.

Figure 2:
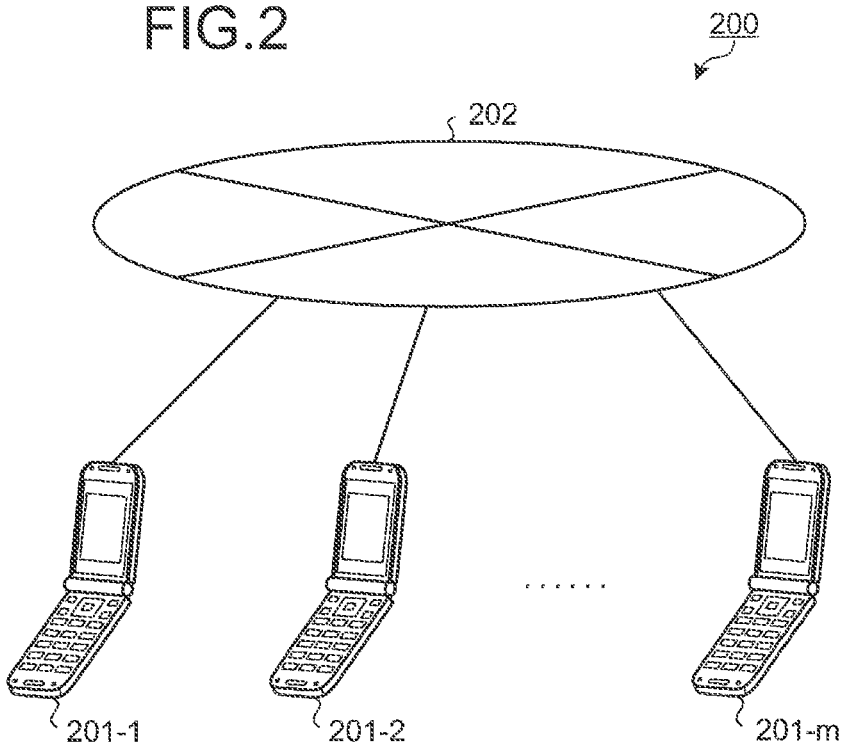
FIG. 2 is an explanatory view of an example of a file sharing system according to a second embodiment.

FIG. 2 is an explanatory view of an example of a file sharing system according to the second embodiment. In FIG. 2, a file sharing system 200 is a P2P type system including m terminals 201-1 to 201-*m*. In the file sharing system 200, the terminals 201-1 to 201-*m* are connected via a network 200 such as the Internet, a local area network (LAN), and a wide area network (WAN). The terminals 201-1 to 201-*m* may directly be communicable between terminals or may be communicable via a base station. In the following description, an arbitrary terminal among the terminals 201-1 to 201-*m* is described as a "terminal 201-*k*" (k=1, 2, . . . , m).

The terminals 201-*k* have setting of a division speed at which a file to be shared is divided when the file writing process of a file to be shared is executed and a writing speed of a storage included in the terminals 201-*k*. The storage is an external storage device for supplementing a main memory and includes an internal storage built into the terminal 201-*k* and a detachable mobile storage. The internal storage includes a flash memory, for example. The mobile storage includes an SD card, for example.

When accepting a start request for file sharing from a user, the terminal 201-*k* sets a file sharing group. The file sharing group corresponds to multiple terminals sharing a file. The setting of the file sharing group means that the terminal 201-$k$ acquires address information etc., of the terminals in the file sharing group to set an environment in which a file can be shared.

The terminal 201-$k$ executes the following processes after setting the file sharing group until accepting a termination request for the file sharing from a user and terminating the file sharing. The trigger of the termination of the file sharing is not limited to the termination request from a user. For example, the terminal 201-$k$ may terminate the file sharing if a predetermined time has elapsed after the start of the file sharing.

First, the terminal 201-$k$ acquires values of various parameters used for calculation of an evaluation value of the terminals 201-1 to 201-$m$ and registers the values into a file sharing group database (DB). The evaluation value serves as an index for selecting a terminal to be assigned the file writing process. For example, the various parameters include the communication speed between the terminal 201-$k$ and the other terminals, the remaining battery level of the terminals 201-1 to 201-$m$, and the writing speed of the storage of the terminals 201-1 to 201-$m$. The file sharing group DB will be described later in detail with reference to FIG. 6.

When accepting a write request for the file to be shared from a user, the terminal 201-$k$ calculates the evaluation value from the values of the various parameters registered in the file sharing group DB and selects the terminal having the highest evaluation value as the terminal to be assigned the writing process. The terminal 210-$k$ assigns the file writing process to the selected terminal.

Assigning the file writing process means causing the terminal to execute the file writing process. For example, if the terminal 201-1 accepting the write request for the file has the highest evaluation value, the terminal 201-1 executes the writing process. On the other hand, if a terminal different from the terminal 201-1 accepting the write request for the file has the highest evaluation value, the terminal 201-1 transmits a process request for the file writing process to the terminal having the highest evaluation value. The terminal accepting the process request executes the file writing process.

A calculation example of the completion time of the file writing process of the file to be shared will be described on the assumption that the terminals 201-1 to 201-3 form a file sharing group in the file sharing system 200. The completion time of the file writing process is a time required after a write request is made from a user until completion of the file writing process. Here, as one example, a case where the terminal 201-1 accepts a write request from a user will be described.

Figure 3:
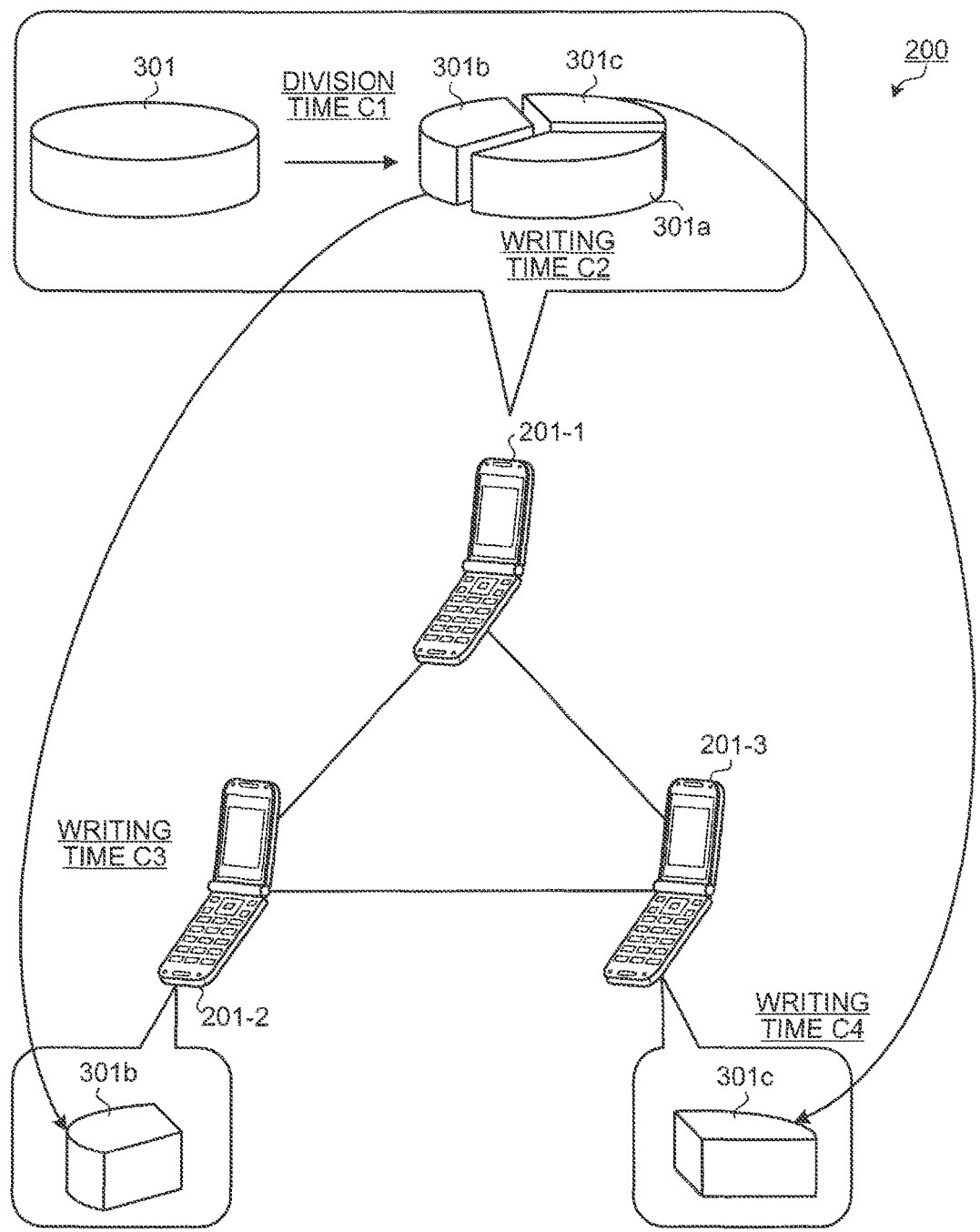
FIGS. 3 and 4 are explanatory views of a calculation example of the completion time of a file writing process of a file to be shared.
Figure 4:
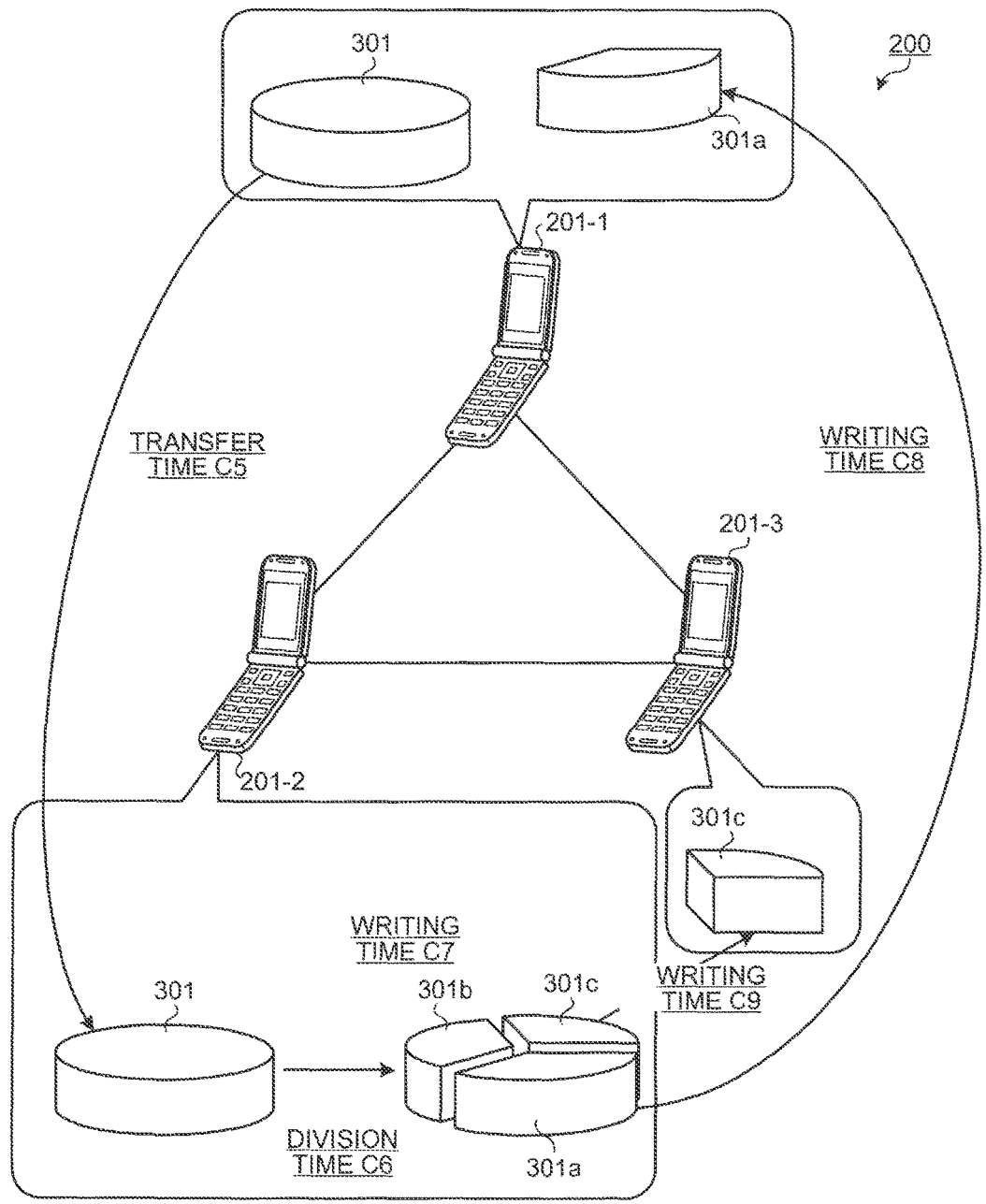

FIGS. 3 and 4 are explanatory views of a calculation example of the completion time of the file writing process of a file to be shared. An example of calculation of the completion time of the writing process (referred to as "completion time $C_W$ of the terminal 201-1" in this example) when the terminal 201-1 accepts from a user, a write request for a file 301, which is to be shared, and executes the file writing process, will be described with reference to FIG. 3.

In FIG. 3, the completion time $C_W$ of the terminal 201-1 is calculated from a division time C1, a writing time C2, a writing time C3, and a writing time C4. The division time C1 is the time consumed for dividing the file 301 by the terminal 201-1 into division data 301$a$ to 301$c$. The writing time C2 is the time consumed for writing the division data 301$a$ divided from the file 301 by the terminal 201-1 into the storage of the terminal 201-1.

The writing time C3 is the total time of the time consumed for transferring the division data 301$b$ from the terminal 201-1 to the terminal 201-2 and the time consumed for writing the division data 301$b$ by the terminal 201-2 into the storage of the terminal 201-2. In other words, the writing time C3 is the time consumed for transferring and writing the division data 301$b$ from the terminal 201-1 to the terminal 201-2.

The writing time C4 is the total time of the time consumed for transferring the division data 301$c$ from the terminal 201-1 to the terminal 201-3 and the time consumed for writing the division data 301$c$ by the terminal 201-3 into the storage of the terminal 201-3. In other words, the writing time C4 is the time consumed for transferring and writing the division data 301$c$ from the terminal 201-1 to the terminal 201-3.

The completion time $C_W$ of the terminal 201-1 is calculated based on the total time of the division time C1 and the writing time C2, the total time of the division time C1 and the writing time C3, and the total time of the division time C1 and the writing time C4. For example, the terminal 201-1 calculates, as the completion time $C_W$ of the terminal 201-1, the longest total time among the total time of the division time C1 and the writing time C2, the total time of the division time C1 and the writing time C3, and the total time of the division time C1 and the writing time C4.

An example of calculation of the completion time of the writing process (referred to as "completion time $C_W$ of the terminal 201-2" in this example) when the terminal 201-1 accepts from the user, the write request for the file 301 and the terminal 201-2 executes the writing process will be described with reference to FIG. 4.

In FIG. 4, the completion time $C_W$ of the terminal 201-2 is calculated from a transfer time C5, a division time C6, a writing time C7, a writing time C8, and a writing time C9. The transfer time C5 is the time consumed for transferring the file 301 from the terminal 201-1 to the terminal 201-2. The division time C6 is the time consumed for dividing the file 301 by the terminal 201-2 into the division data 301$a$ to 301$c$. The writing time C7 is the time consumed for writing the division data 301$b$ divided from the file 301 by the terminal 201-2 into the storage of the terminal 201-2.

The writing time C8 is the total time of the time consumed for transferring the division data 301$a$ from the terminal 201-2 to the terminal 201-1 and the time consumed for writing the division data 301$a$ by the terminal 201-1 into the storage of the terminal 201-1. In other words, the writing time C8 is the time consumed for transferring and writing the division data 301$a$ from the terminal 201-2 to the terminal 201-1.

The writing time C9 is the total time of the time consumed for transferring the division data 301$c$ from the terminal 201-2 to the terminal 201-3 and the time consumed for writing the division data 301$c$ by the terminal 201-3 into the storage of the terminal 201-3. In other words, the writing time C9 is the time consumed for transferring and writing the division data 301$c$ from the terminal 201-2 to the terminal 201-3.

The completion time $C_W$ of the terminal 201-2 is calculated based on the total time A1 of the division time C6 and the writing time C7, the total time A2 of the division time C6 and the writing time C8, the total time A3 of the division time C6 and the writing time C9, and the transfer time C5. For example, the terminal 201-1 calculates as the completion time $C_W$ of the terminal 201-2 the longest total time among the total time of the transfer time C5 and the total time A1, the total time of the transfer time C5 and the total time A2, and the total time of the transfer time C5 and the total time A3.

Figure 5:
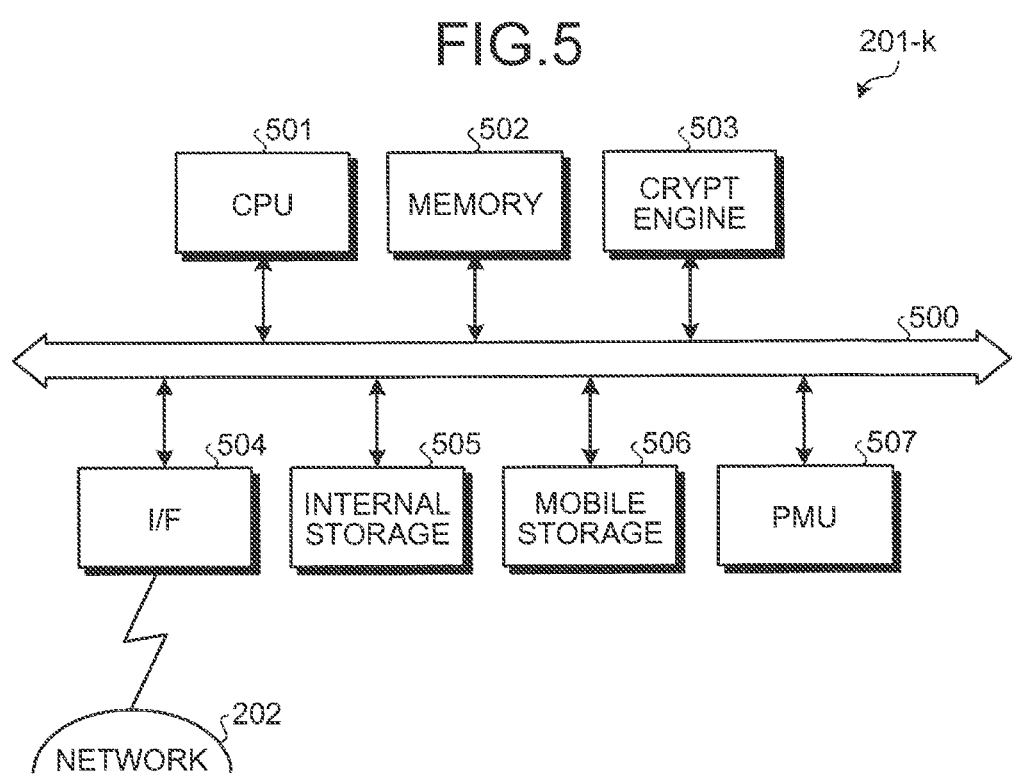
FIG. 5 is a block diagram of a hardware example of a terminal according to the second embodiment.

FIG. 5 is a block diagram of a hardware example of the terminal according to the second embodiment. In FIG. 5, the terminal 201-k includes a CPU 501, memory 502, a crypt engine 503, an interface (I/F) 504, internal storage 505, mobile storage 506, and a power management unit (PMU) 507, respectively connected by a bus 500.

The CPU 501 governs overall control of the terminal 201-k. Although herein the terminal 201-k includes a single CPU, without limitation hereto, the terminal 201-k may include multiple CPUs. The memory 502 is a storage device that is directly accessed by the CPU 501 and, for example, is read-only memory (ROM), random access memory (RAM), etc. The ROM stores programs such as a boot program. The RAM is used as a work area of the CPU 501.

The crypt engine 503 executes a file encryption process. For example, the crypt engine 503 executes on division data obtained by dividing a file to be shared, an encryption process by using different terminal numbers, etc. of the respective terminals. The I/F 504 is connected to the network 202 such as a LAN, a WAN, and the Internet through a communication line and is connected via the network 202 to another terminal. The I/F 504 is responsible for interface between the network 202 and the inside and controls the input and output of data with respect to an external apparatus. For example, a modem or a LAN adapter may be adopted as the I/F 504

The internal storage 505 is storage built into the terminal 201-k and stores the division data divided from the file to be shared. The mobile storage 506 is storage detachable from the terminal 201-k and stores the division data divided from the file to be shared. The PMU 507 is responsible for control of the battery of the terminal 201-k and detects the remaining battery level.

Contents of the file sharing group DB will be described. The file sharing group DB is implemented by a storage device such as the memory 502, the internal storage 505, and the mobile storage 506 of the terminal 201-k depicted in FIG. 5, for example. The contents will be described by taking a file sharing group DB 600 included in the terminal 201-1 as an example.

FIG. 6 is an explanatory view of an example of the contents of the file sharing group DB. In FIG. 6, the file sharing group DB 600 included in the terminal 201-1 has fields of a terminal name T, a division speed Q, a storage number N, a writing speed $S_W$, a remaining battery level B, a communication speed tn, a estimated communication speed tf, and a unit writing time Write. By setting information into the fields, terminal characteristic data 601-1 to 601-m are stored as records.

The file sharing group DB 600 has a record for the terminal 201-1 having the file sharing group DB 600 stored as first terminal characteristic data 601-1. Records for terminals other than the terminal 201-1 (hereinafter referred to as "other terminals") are stored as the second and subsequent terminal characteristic data 601-2 to 601-m. The terminals 210-1 to 201-3 form a file sharing group in this example.

The terminal name T is a name for identifying a terminal and may be a unique ID etc., for each terminal. For example, the terminal name T of the terminal 201-1 is "X"; the terminal name T of the terminal 201-2 is "Y"; and the terminal name T of the terminal 201-3 is "Z". Hereinafter, a terminal T refers to a terminal having the terminal name T of "T". For example, a terminal X refers to a terminal having the terminal name T of "X".

The division speed Q is a data size divided per unit time when the file to be shared is divided, and is in [MB/s]. The division speed Q is determined depending on the CPU performance of the terminals 201-1 to 210-3. In the following description, the division speed Q corresponding to the terminal name T is described as a "division speed $Q_T$". For example, a division speed $Q_X$ refers to the division speed Q of the terminal 201-1 having the terminal name T of "X".

The storage number N is the total number of internal and mobile storages of each terminal. The storage number N is updated when a mobile storage is attached/detached. In the following description, the storage number N corresponding to the terminal name T is described as a "storage number $N_T$". For example, a storage number $N_X$ refers to the storage number N of the terminal 201-1 having the terminal name T of "X".

The writing speed $S_W$ is a data size written per unit time when the division data divided from the file to be shared is written into storage, and is in [MB/s]. The writing speed $S_W$ is registered depending on attachment/detachment of a storage for each storage. In the following description, the writing speed $S_W$ corresponding to the terminal name T is described as a "writing speed $S_{WT}$". For example, a writing speed $S_{WX}$ refers to the writing speed $S_W$ of the terminal 201-1 having the terminal name T of "X".

In the following description, the writing speed $S_W$ corresponding to an i-th storage of each terminal is described as a "writing speed $S_{Wi}$". For example, a writing speed $S_{Wi}$ refers to the writing speed $S_W$ of a first storage. Therefore, a writing speed $S_{WX1}$ refers to the writing speed $S_W$ of the first storage of the terminal 201-1 having the terminal name T of "X". In this example, an internal storage is the first storage and a mobile storage is a second or later storage.

The remaining battery level B is a relative remaining amount of a battery of each terminal and is in [%]. A terminal acquires the remaining battery level B thereof at predetermined intervals. The terminal acquires the remaining battery levels B of the other terminals when a write request is accepted from a user. In the following description, the remaining battery level B corresponding to the terminal name T is described as a "remaining battery level $B_T$". For example, a remaining battery level $B_X$ refers to the remaining battery level B of the terminal 201-1 having the terminal name T of "X".

The communication speed tn is a data size communicable per unit time between a given terminal and another terminal and is in [MB/s]. The communication speed tn is acquired when a given terminal periodically performs communication with a base station. In the following description, the communication speed tn corresponding to a given terminal To and another terminal Ta is described as a "communication speed $tn_{ToTa}$". For example, a communication speed $tn_{xy}$ refers to the communication speed tn between the terminal 201-1 having the terminal name T of "X" and the terminal 201-2 having the terminal name T of "Y".

The estimated communication speed tf is a predicted value of a communication speed after a unit time has elapsed, and is calculated based on a past communication speed and the newest communication speed. The past communication speed is a communication registered in the file sharing group DB 600 when the newest communication speed is acquired. The estimated communication speed tf is in [MB/s]. The estimated communication speed tf is calculated at the same intervals as the acquisition of the communication speed tn. In the following description, the estimated communication speed tf corresponding to a given terminal To and another terminal Ta is described as an "estimated communication speed $tf_{ToTa}$". For example, an estimated communication speed $tf_{xy}$" refers to the estimated communication speed tf between the terminal having the terminal name T of "X" and the terminal having the terminal name T of "Y".

The unit writing time Write is a writing process time per unit data size of each terminal and is in [ms/MB]. The writing process time is a time from start of execution of a writing process by each terminal until completion and is, for example, the time consumed for dividing the file to be shared, transmitting the data to the other terminals, and completing the writing into the storage of the terminals. Therefore, by multiplying the unit writing time Write by the data size of the file to be shared, the time can be calculated that is consumed from the start of execution of the file writing process of the file to be shared by a corresponding terminal until completion.

A terminal calculates and registers the unit writing time Write corresponding to the terminal at predetermined intervals. The unit writing time Write corresponding to the other terminals is acquired from the other terminals and registered when a write request is accepted from a user. In the following description, the unit writing time Write corresponding to the terminal name T is described as a "unit writing time $Write_T$". For example, a unit writing time $Write_X$ refers to the unit writing time Write of the terminal 201-1 having the terminal name T of "X".

By way of example, taking the terminal characteristic data 601-2 as an example, the stored data are the terminal name T of "Y", the division speed $Q_Y$=150 [MB/s], the storage count $N_Y$=2 [units], the writing speed $S_{WY1}$=20 [MB/s], the writing speed $S_{WY2}$=15 [MB/s], the remaining battery level $B_Y$=75 [%], the communication speed $tn_{XY}$=10 [MB/s], the estimated communication speed $tf_{XY}$=15 [MB/s], and the unit writing time $Write_Y$=76 [ms/MB].

Figure 7:
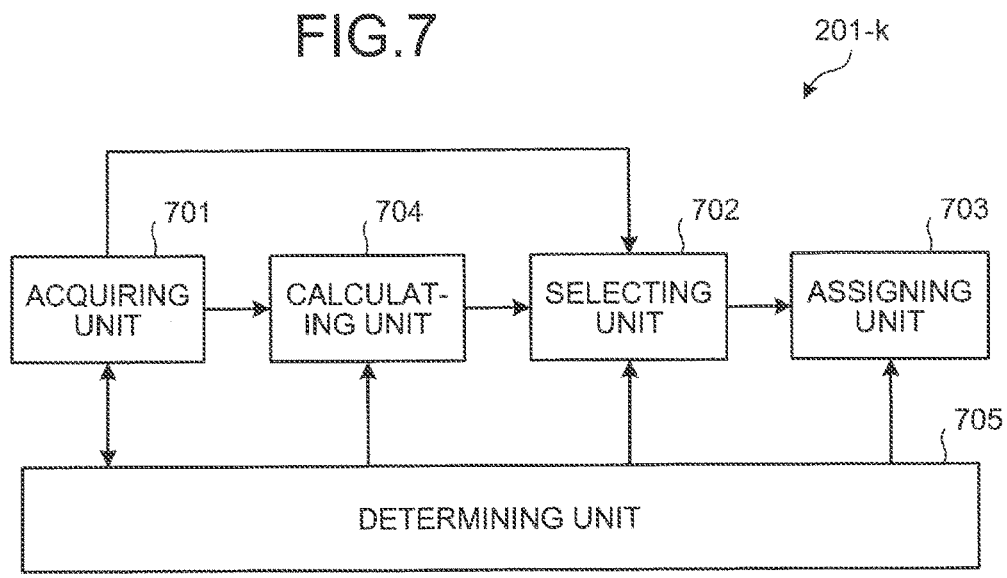
FIG. 7 is a block diagram of an example of functions of the terminal according to the second embodiment.

An example of functions of the terminal 201-$k$ according to the second embodiment will be described. FIG. 7 is a block diagram of an example of functions of the terminal according to the second embodiment. The terminal 201-$k$ includes an acquiring unit 701, a selecting unit 702, an assigning unit 703, a calculating unit 704, and a determining unit 705. For example, the functions of the functional units (the acquiring unit 701 to the determining unit 705) are implemented by causing the CPU 501 to execute a program stored in a storage device such as the memory 502, the internal storage 506, and the mobile storage 506 depicted in FIG. 5 or by the I/F 504. Processing results of the functional units is stored in the storage device such as the memory 502, the internal storage 506, and the mobile storage 506.

The acquiring unit 701 acquires the remaining battery level B of each terminal 201-1 to 210-$m$ sharing the file to be shared. For example, the acquiring unit 701 acquires the remaining battery level B of the terminal thereof from the PMU of the terminal. The acquiring unit 701 acquires the remaining battery levels B of the other terminals from the other terminals.

For example, the remaining battery level B acquiring process of the acquiring unit 701 may be executed when a write request for a file is accepted from a user or may be executed at predetermined intervals.

The selecting unit 702 selects a terminal to execute a file writing process among the terminals 201-1 to 201-$m$. For example, the selecting unit 702 selects, as the terminal to execute the file writing process, a terminal having the largest remaining battery level B acquired by the acquiring unit 701 or one of terminals having the remaining battery level B greater than or equal to a predetermined value.

As a result, the selecting unit 702 can select, as a terminal to execute the file writing process, a terminal having the lowest probability of running out of battery power during the file writing process among the terminals 201-1 to 210-$m$.

The assigning unit 703 assigns a file writing process to the terminal selected by the selecting unit 702. For example, if the terminal thereof is selected, the assigning unit 703 assigns the file writing process to the terminal thereof. As a result, the terminal 201-$k$ executes the file writing process. If another terminal is selected, the assigning unit 703 transmits a process request for the file writing process to the other terminal. As a result, the terminal receiving the process request executes the file writing process.

The acquiring unit 701 acquires information for calculating the completion time of the file writing process. As described above, the completion time of the file writing process includes a transfer time for transferring the file to the terminal to execute the file writing process, a division time for dividing the file, and a distribution time for distribution of the divided division data in the multiple terminals. The distribution is to transfer the division data to the terminals to cause the terminals to write the division data into the storages of the terminals. The information for calculating the completion time includes, for example, the data size of the file to be shared, the division speed Q of the file to be shared at each terminal, the writing speed $S_W$ of the division data to the storage in each terminal, and the communication speed to between the terminal and the other terminals.

For example, the acquiring unit 701 refers to a file to be shared and acquires the data size of the file. The acquiring unit 701 acquires the division speed Q of data by the terminal thereof, from the file sharing group DB (see, e.g., FIG. 6). For example, the division speed Q of data of the terminal thereof is preset at the time of manufacture and registered in the file sharing group DB.

For example, when starting sharing of the file, the acquiring unit 701 acquires the division speed Q of the other terminals from the other terminals. For example, the acquiring unit 701 writes data of a minute size (e.g., several bits) into the storage of the terminal thereof and measures the time from the start of writing of the data until completion to acquire the writing speed $S_{Wi}$ of the terminal. The acquired writing speed $S_{Wi}$ of the terminal is registered in the file sharing group DB, for example.

For example, when starting sharing of the file, the acquiring unit 701 acquires the writing speed $S_{Wi}$ of the other terminals from the other terminals. The acquired writing speed $S_{Wi}$ of the other terminals is registered in the file sharing group DB, for example. The writing speeds $S_{Wi}$ of the terminal thereof and the other terminals are acquired each time the storage of the terminal thereof and the other terminals is attached/detached, for example.

The acquiring unit 701 measures the time from transmission of data of a minute size (e.g., several bits) to another terminal until response from another terminal to acquire the communication speed tn between the terminal thereof and the other terminal. The acquired communication speed tn between the terminal thereof and the other terminal is registered in the file sharing group DB, for example. The communication speed tn between the terminal thereof and the other terminal is acquired at predetermined intervals, for example.

The calculating unit 704 calculates the completion time $C_W$ of the file writing process at each terminal based on the information acquired by the acquiring unit 701. For example, the calculating unit 704 uses information acquired by the acquiring unit 701 and a predetermined equation to calculate the completion time $C_W$ of the file writing process in each terminal.

In the following description, if a terminal having the terminal name T of "T1" accepts a write request for a file from a user, the completion time $C_W$ of the file writing process corresponding to a terminal having the terminal name T of "T2" is described as a "completion time $C_{WT1T2}$". For example, a completion time $C_{WXY}$ refers to the completion time $C_W$ when a terminal having the terminal name T of "X" accepts a write request for a file from a user and a terminal having the terminal name T of "Y" executes the writing process.

The completion time $C_W$ calculated by the calculating unit 704 will be described by taking a file sharing group corresponding to the file sharing group DB 600 depicted in FIG. 6 as an example. For example, the calculating unit 704 can use Equation (1) to calculate a completion time $C_{WXX}$ when a terminal X accepting a write request from a user assigns a writing process to the terminal X.

In Equation (1), F is a parameter indicative of a data size of the file to be shared. $Q_X$ is a parameter indicative of the division speed Q of the terminal X. N is a parameter indicative of the total storage number of the file sharing group. $N_X$ is a parameter indicative of the storage number of the terminal X. $N_Y$ is a parameter indicative of the storage number of the terminal Y. $N_Z$ is a parameter indicative of the storage number of the terminal Z. Therefore, N is a value acquired by adding $N_X$, $N_Y$, and $N_Z$. $S_{WXi}$ is a parameter indicative of the writing speed $S_W$ of the i-th storage of the terminal X. $S_{WYi}$ is a parameter indicative of the writing speed $S_W$ of the i-th storage of the terminal Y. $S_{WXi}$ is a parameter indicative of the writing speed $S_W$ of the i-th storage of the terminal Z. $Tn_{XY}$ is a parameter indicative of the communication speed tn between the terminal X and the terminal Y. $Tn_{XZ}$ is a parameter indicative of the communication speed tn between the terminal X and the terminal Z.

$$C_{WXX} = F/Q_X + \text{Max} \begin{Bmatrix} \sum_{i=1}^{N_X} F/N \Big/ S_{WXi}, \frac{N_Y F}{N} \Big/ tn_{XY} + \\ \sum_{i=1}^{N_Y} \frac{F}{N} \Big/ S_{WYi}, \frac{N_Z F}{N} \Big/ tn_{XZ} + \\ \sum_{i=1}^{N_Z} \frac{F}{N} \Big/ S_{WZi} \end{Bmatrix} \quad (1)$$

$$= F \times \begin{bmatrix} 1/Q_X + \text{Max} \begin{Bmatrix} \sum_{i=1}^{N_X} \frac{1}{N} \Big/ S_{WXi}, \frac{N_Y}{N} \Big/ tn_{XY} + \\ \sum_{i=1}^{N_Y} \frac{1}{N} \Big/ S_{WYi}, \frac{N_Z}{N} \Big/ tn_{XZ} + \\ \sum_{i=1}^{N_Z} \frac{1}{N} \Big/ S_{WZi} \end{Bmatrix} \end{bmatrix}$$

$$= F \times \text{Write}_X$$

Therefore, the calculating unit 704 can substitute the values of the various parameters described above in Equation (1) to calculate the completion time $C_{WXX}$ when the terminal X accepting the write request for the file from a user executes the writing process.

In the equation on the second line of Equation (1), a first element indicates a time for dividing the file to be shared. Elements in parentheses of the equation on the second line of Equation (1) are a time of writing the division data divided from the file to be shared into the terminal thereof, and a time from the start of transfer of the division data to the other terminals until completion of writing into the storages of the terminals. Since the transfer and writing of the division data into the terminals are concurrently performed for the respective terminals, a maximum value in parentheses is used for calculating a processing time of the process having the longest processing time.

In Equation (1), the equation on the third line is acquired by developing the equation on the second line with F and the equation on the fourth line is acquired by replacing the elements in parentheses of the equation on the third line with the unit writing time $\text{Write}_X$. Equation (1) enables the calculation of the completion time $C_{WXX}$ from when the terminal X accepting the write request from a user divides the file to be shared until completing the writing of the division data into all the terminals.

In the example of the file sharing group DB 600 depicted in FIG. 6, the values of the various parameters are as follows: F=12 [MB]; $Q_X$=50 [MB/s]; N=5 [pieces]; $N_X$=1 [unit]; $N_Y$=2 [units]; $N_Z$=2 [units]; $S_{WX1}$=10 [MB/s]; $S_{WY1}$=20 [MB/s]; $S_{WY2}$=15 [MB/s]; $S_{WZ1}$=10 [MB/s]; $S_{WZ2}$=20 [MB/s]; $tn_{XY}$=10 [MB/s]; and $tn_{XZ}$=20 [MB/s].

In this case, the calculating unit 704 can substitute the values of the various parameters into Equation (1) to calculate the unit writing time $\text{Write}_X$=83 [ms/MB] and the completion time $C_{WXY}$=1.0 [s].

Another terminal can use the equation same as Equation (1) to calculate the completion time $C_W$ when the terminal accepting the write request from a user executes the writing process. For example, when the terminal Y accepting the write request from a user executes the writing process, the completion time $C_{WXY}$ is calculated by the terminal Y substituting the values of the various parameters in an equation acquired by replacing X with Y in Equation (1).

For example, the calculating unit 704 can use Equation (2) to calculate a completion time $C_{WXY}$ when the terminal X accepting a write request from a user assigns a file writing process to the terminal Y.

$$C_{WXY} = F/tn_{XY} + C_{WYY} \quad (2)$$
$$= F/tn_{XY} + F \times \text{Write}_Y$$

Therefore, the calculating unit 704 can substitute the values of F, $tn_{XY}$, and $\text{Write}_1$ into Equation (2) to calculate the completion time $C_{WXY}$. In the equation on the first line of Equation (2), a first element is a time for transferring the file to be shared from terminal X to the terminal Y, and a second element is the completion time $C_{WYY}$ required from the start of the writing process by the terminal Y until completion. A second element of the equation on the second line of Equation (2) is acquired by factorizing the completion time $C_{WYY}$ as in Equation (1).

For example, if the values of the various parameters are F=12 [MB], $tn_{XY}$=10 [MB/s], and $\text{Write}_Y$=76 [ms/MB], the completion time $C_{WXY}$ is 2.1 [s].

Another terminal can use the equation same as Equation (2) to calculate the completion time $C_W$ when a terminal different from a terminal accepting the write request from a user executes the writing process. For example, when the terminal Z different from the terminal Y accepting the write request from a user executes the writing process, the completion time $C_{WYZ}$ is calculated by the terminal Y substituting the values of the various parameters in an equation acquired by replacing X and Y with Y and Z, respectively, in Equation (2).

The selecting unit 702 may select a terminal to execute the file writing process based on a calculation result from the calculating unit 704. For example, the selecting unit 702 selects the terminal having the shortest calculated completion time $C_W$ of the file writing process as the terminal to execute the file writing process. For example, if the terminal X accepts a write request for a file from a user, the selecting unit 702 selects the terminal corresponding to the shortest completion time among the completion time $C_{WXX}$, the completion time $C_{WXY}$, and the completion time $C_{WXZ}$ as the terminal to be assigned the writing process.

As a result, the selecting unit 702 can select the terminal having the shortest completion time $C_W$ for the file writing process as the terminal to execute the file writing process among the terminals 201-1 to 201-$m$.

The calculating unit 704 may calculate an evaluation value (hereinafter, referred to as an "evaluation value $V_W$") used as an index for selecting the terminal to be assigned the file writing process based on the remaining battery level B and the completion time $C_W$ of the file writing process. In the following description, when the terminal X accepts the write request from a user, the evaluation value $V_W$ of the terminal X is described as "$V_{WXX}$". If the terminal X accepts the write request from a user, the evaluation value $V_W$ of the terminal Y is described as "$V_{WXY}$".

The evaluation value $V_W$ calculated by the calculating unit 704 will be described by taking a file sharing group corresponding to the file sharing group DB 600 depicted in FIG. 6 as an example. For example, the calculating unit 704 can use any of the following Equations (3) to (5) to calculate the evaluation value $V_{WXX}$ of the terminal X when the terminal X accepts the write request from a user. In Equations (3) to (5), $B_X$ is a parameter indicative of the remaining battery level B of the terminal X. Additionally, $\alpha$ and $\beta$ are predetermined coefficients.

$$V_{WXX} = \alpha \times B_X - \beta \times C_{WXX} \tag{3}$$

$$V_{WXX} = \alpha \times B_X^2 - \beta \times C_{WXX} \tag{4}$$

$$V_{WXX} = \alpha \times \sqrt{B_X} - \beta \times C_{WXX} \tag{5}$$

Therefore, the calculating unit 704 can substitute the values of $B_X$ and $C_{WXX}$ in any of Equations (3) to (5) to calculate the evaluation value $V_{WXX}$ of the terminal X when the terminal X accepts the write request from a user. In any of Equations (3) to (5), the larger the remaining battery level B is and the shorter the completion time $C_W$ is, the higher the calculated evaluation value is.

Another terminal can use the equations same as Equations (3) to (5) to calculate the evaluation value $V_W$. For example, when the terminal X accepts the write request for the file, the evaluation value $V_{WXY}$ of the terminal Y can be calculated by using the equations acquired by replacing $B_X$ and $C_{WXX}$ with $B_Y$ and $C_{WXY}$, respectively, in Equations (3) to (5).

In this case, the selecting unit 702 may select the terminal to execute the file writing process among the terminals 201-1 to 201-$m$ based on the evaluation value $V_W$ calculated by the calculating unit 704. For example, the selecting unit 702 selects the terminal having the highest evaluation value $V_W$ calculated by the calculating unit 704 as the terminal to execute the file writing process.

As a result, the selecting unit 702 can select as the terminal to execute the file writing process a terminal having the lowest possible probability of running among the battery during the file writing process and having the shortest possible completion time $C_W$ of the file writing process among the terminals 201-1 to 210-$m$.

The determining unit 705 determines whether the file writing process is executed based on the communication speed tn. For example, the determining unit 705 compares the current communication speed tn with a predetermined threshold D and determines that the file writing process is not executed if the communication speed tn is less than the predetermined threshold D. On the other hand, if the communication speed tn is greater than or equal to the predetermined threshold D, the determining unit 705 determines that the file writing process is executed.

The threshold D is set to a value such that, for example, if the communication speed tn between terminals becomes less than the threshold D, data is likely to be lost due to interruption of the communication between the terminals. For example, the threshold D is set and stored in advance in the storage device such as the memory 502 and the internal storage 505.

The estimated communication speed tf may be used as an object to be compared with the threshold D. As a result, it can be determined that the file writing process is not executed if data is likely to be lost due to interruption of the communication between the terminals in the future.

The various processes of the acquiring unit 701, the selecting unit 702, the assigning unit 703, and the calculating unit 704 may be executed, for example, if the determining unit 705 determines that the writing process is executed.

This enables the terminal 201-$k$ to prevent a loss of division data due to interruption of communication during transfer of the division data between terminals.

If it is determined that the file writing process is not to be executed, the terminal 201-$k$ may store the file into a storage device such as the memory 502, the internal storage 506, and the mobile storage 506. The terminal 201-$k$ may re-execute the determination process by the determining unit 705 after a predetermined time has elapsed or may wait until the write request for the file from a user is accepted again. Alternatively, when the communication speed to becomes greater than or equal to the threshold D, the terminal 201-$k$ may resume the file writing process stored in the storage device thereof.

If the determining unit 705 determines that the writing process is not to be executed, the terminal 201-$k$ may output an error message. For example, the terminal 201-$k$ displays character information on a display (not depicted) to output the error message. The character information is, for example, "Please re-execute the writing process after a while because a communication status is currently poor", "An error has occurred. Sharing is terminated.", etc.

If a write request for a file to be shared is accepted from a user and the communication speed tn is less than the threshold D, the terminal 201-$k$ may write the data corresponding to the write request into the storage of the terminal thereof without reflecting the data on the file to be shared. When the communication speed tn becomes greater than or equal to the threshold D, the terminal 201-$k$ may reflect the data written into the storage of the terminal thereof on the file to be shared. For example, the data corresponding to the write request is correction data for correcting the file to be shared.

An example of a process procedure executed by the terminal 201-$k$ will hereinafter be described.

FIG. 8 is a flowchart of an example of a procedure of the file sharing setting process of the terminal according to the second embodiment. The file sharing setting process is a process executed by the CPU 501. In the file sharing setting process, the terminal 201-k determines whether a start request for file sharing has been accepted from a user (step S801) and, if not (step S801: NO), the terminal 201-k waits until the acceptance.

At step S801, when a start request for file sharing is accepted from a user (step S801: YES), the acquiring unit 701 acquires values of various parameters (step S802). The various parameters are static parameters and are the division speed Q and the writing speed $S_{Wj}$ in the other terminals, for example. The terminal 201-k registers the acquired values of the various parameters into the file sharing group DB included in the terminal 201-k (step S803).

The terminal 201-k then determines whether a termination request for file sharing has been accepted from a user (step S804). If a termination request for file sharing has not been accepted from a user (step S804: NO), the acquiring unit 701 executes a communication speed collection process (see FIG. 9) (step S805). The communication speed collection process is a process of collecting communication speed between the terminal and the other terminals.

The acquiring unit 701 then acquires the remaining battery level B of the terminal 201-k from the PMU 507 (step S806). The terminal 201-k registers the acquired remaining battery level B of the terminal 201-k into the file sharing group DB (step S807). The terminal 201-k determines whether a change notification of a mobile storage indicative of detection of insertion/removal of the mobile storage has been received from another terminal (step S808). If no change notification of a mobile storage has been received (step S808: NO), the terminal 201-k goes to step S810.

At step S808, if a change notification of a mobile storage has been received (step S808: YES), the terminal 201-k registers details of the change into the file sharing group DB (step S809). For example, the terminal 201-k updates and registers the writing speed $S_{Wj}$ of the storage detected as being inserted/removed. The calculating unit 704 then calculates the unit writing time Write of the terminal 201-k (step S810).

The terminal 201-k registers the calculated unit writing time Write of the terminal 201-k into the file sharing group DB (step S811) and goes to step S804. At step S804, if the termination request for file sharing has been accepted from a user (step S804: YES), the terminal 201-k terminates a sequence of the process of this flowchart.

FIG. 9 is a flowchart of an example of a procedure of the communication speed collection process of the terminal according to the second embodiment. In the communication speed collection process, the acquiring unit 701 acquires the communication speed tn between the terminal 201-k and the other terminals (step S901).

At step S901, for example, the terminal 201-k transmits data of a minute data size to each of the other terminals and measures the time until reception of information indicative of completion of transmission from each of the other terminals to acquire each communication speed tn. The terminal 201-k extracts the communication speed tn registered in the file sharing group DB (step S902).

The calculating unit 704 calculates the estimated communication speed tf (step S903). For example, the calculating unit 704 adds a difference between the communication speed tn acquired at step S901 and the communication speed tn acquired at step S902 to the communication speed tn acquired at step S901 to calculate the estimated communication speed tf. If the communication speed tn is not registered in the file sharing group DB, i.e., in a first communication speed collection process after the start of file sharing, steps S902 to S904 may not be performed.

The terminal 201-k registers the communication speed tn acquired at step S901 into the file sharing group DB (step S904). The terminal 201-k then registers the estimated communication speed tf calculated at step S903 into the file sharing group DB (step S905) and terminates a sequence of the process of this flowchart.

FIG. 10 is a flowchart of an example of a procedure of the storage insertion/removal detection process of the terminal according to the second embodiment. The storage insertion/removal detection process is a process executed by the CPU 501. In the storage insertion/removal detection process, the terminal 201-k determines whether insertion/removal of a mobile storage has been detected (step S1001) and, if not (step S1001: NO), the terminal 201-k waits until the detection.

At step S1001, if the insertion/removal of a mobile storage has been detected (step S1001: YES), the terminal 201-k determines whether the mobile storage is available (step S1002). In this way, the terminal 201-k determines whether the mobile storage is attached.

At step S1002, if the mobile storage is not available (step S1002: NO), the terminal 201-k goes to step S1004. If the mobile storage is available (step S1002: YES), the acquiring unit 701 measures the writing speed $S_{W}$, of the mobile storage (step S1003).

The terminal 201-k updates the file sharing group DB (step S1004). If the mobile storage is available at step S1002, the terminal 201-k updates the writing speed $S_{W}$, measured at step S1003 in the file sharing group DB. If the mobile storage is not available at step S1002, the terminal 201-k deletes the writing speed $S_{W}$, corresponding to the mobile storage from the file sharing group DB.

The terminal 201-k then transmits a mobile storage change notification including the information of the writing speed $S_{Wj}$ corresponding to the mobile storage to the other terminals to make a notification of a change in the mobile storage (step S1005) and terminates a sequence of the process of this flowchart.

FIG. 11 is a flowchart of an example of a procedure of the write request acceptance process of the terminal according to the second embodiment. The write request acceptance process is a process executed by the CPU 501. In the write request acceptance process, the terminal 201-k determines whether a write request for a file to be shared has been accepted from a user (step S1101) and, if not accepted (step S1101: NO), the terminal 201-k waits until the acceptance.

At step S1101, when a write request for a file to be shared has been accepted from a user (step S1101: YES), the determining unit 705 determines whether the estimated communication speed tf between one or more of the other terminals and the terminal 201-k is less than the predetermined threshold D (step S1102). If the estimated communication speed tf between one or more of the other terminals and the terminal 201-k is less than the predetermined threshold D (step S1102: YES), the terminal 201-k goes to step S1111.

If the estimated communication speed tf between all the other terminals and the terminal 201-k is greater than or equal to the predetermined threshold D (step S1102: NO), the acquiring unit 701 acquires the unit writing time Write and the remaining battery level B of the other terminals (step S1103). The terminal 201-k registers the acquired unit writing time Write and remaining battery level B of the other terminals into the file sharing group DB (step S1104).

After step S1104, the calculating unit 704 executes an evaluation value calculation process (see FIG. 12) of calculating the evaluation value $V_W$ (step S1105). The assigning unit 703 executes a writing assignment process (see FIG. 13) of assigning the writing process to a terminal (step S1106).

After step S1106, the terminal 201-$k$ determines whether the file writing process has been completed (step S1107). The completion of the file writing process means that the terminal 201-$k$ acquires information for notification of completion of the file writing process from another terminal assigned the file writing process. If the writing process is assigned to the terminal 201-$k$, the completion of the writing process means that the terminal 201-$k$ acquires information indicative of completion of writing of the division data into the storages from all the other terminals.

At step S1107, if the file writing process has been completed (step S1107: YES), the terminal 201-$k$ terminates a sequence of the process of this flowchart. If the file writing process is not completed (step S1107: NO), the terminal 201-$k$ determines whether a fault has been detected (step S1108). For example, the terminal 201-$k$ detects a fault such as removal of the mobile storage during writing of the division data divided from the file to be shared.

If a fault has been detected (step S1108: YES), the terminal 201-$k$ executes an error process (step S1109) and terminates a sequence of the process of this flowchart. The execution of the error process means that the terminal 201-$k$ writes error information as a log or displays the occurrence of an error, for example.

At step S1108, if no fault has been detected (step S1108: NO), the determining unit 705 determines whether the estimated communication speed tf is lower than the predetermined threshold D (step S1110). If the estimated communication speed tf is not lower than the predetermined threshold D (step S1110: NO), the terminal 201-$k$ goes to step S1107.

At step S1110, if the estimated communication speed tf is lower than the predetermined threshold D (step S1110: YES), the terminal 201-$k$ writes the file to be shared into the storage of the terminal 201-$k$ (step S1111) and terminates a sequence of the process of this flowchart. With regard to the file to be shared written at step S1111, the file writing process is assumed to be executed another time when the communication speed to exceeds the threshold D.

FIG. 12 is a flowchart of an example of a procedure of the evaluation value calculation process of the terminal according to the second embodiment. In the evaluation value calculation process, the terminal 201-$k$ extracts values of various parameters from the file sharing group DB (step S1201).

After step S1201, the calculating unit 704 calculates the completion time (step S1202). In this case, equations such as Equations (1) and (2) are used. The calculating unit 704 then calculates the evaluation value $V_W$ (step S1203) and terminates a sequence of the process of this flowchart. At step S1203, equations such as Equations (3) to (5) are used.

FIG. 13 is a flowchart of an example of a procedure of the writing assignment process of the terminal according to the second embodiment. In the writing assignment process, the terminal 201-$k$ refers to the evaluation value $V_W$ calculated in the evaluation value calculation process (step S1301). The selecting unit 702 selects the terminal to execute the writing process (step S1302). In this case, for example, the selecting unit 702 selects the terminal having the highest evaluation value $V_W$ as the terminal to execute the writing process.

The terminal 201-$k$ then determines whether the terminal selected at step S1302 is the terminal 201-$k$ (step S1303). If the selected terminal is the terminal 201-$k$ (step S1303: YES), the terminal 201-$k$ starts executing the writing process (step S1304) and terminates a sequence of the process of this flowchart. In this case, for example, the terminal 201-$k$ divides the file to be shared and uses the crypt engine 503 to encrypt the division data divided from the file to be shared. The terminal 201-$k$ writes the encrypted division data into the storage of the terminal 201-$k$ and transmits the division data divided from the file to be shared to the other terminals.

If the terminal selected at step S1302 is another terminal (step S1303: NO), the assigning unit 703 transmits the write request to the selected terminal (step S1305) and terminates a sequence of the process of this flowchart.

As described above, the terminal 201-$k$ according to the second embodiment can select the terminal to be assigned the file writing process based on the remaining battery level B of the terminals sharing the file and the completion time $C_W$ of the file writing process. In other words, the terminal to execute the file writing process can be selected by comprehensively evaluating the remaining battery level B of the terminals, the processing performance, and the communication status between terminals.

Therefore, the terminal 201-$k$ can select a terminal having the lowest possible probability of running out of battery power during execution of the file writing process and having the shortest possible completion time $C_W$ for completing the writing process as the terminal to be assigned the writing process. As a result, the battery can be prevented from running out during execution of the file writing process and the processing time of the file writing process can be reduced.

If the estimated communication speed tf between the terminal 201-$k$ and the other terminals is lower than the predetermined threshold D, the terminal 201-$k$ can refrain from executing the file writing process to prevent the interruption of communication during transfer of the division data. If the communication between the terminal and the other terminals is interrupted during transfer of the division data divided from the file to be shared from the terminal to the other terminals, the division data being transmitted may be lost. Therefore, by preventing the interruption of the communication during transmission of the division data as described above, a loss of the division data can be prevented.

In the second embodiment, when the write request for the file is accepted from a user, the terminal 201-$k$ selects the terminal to execute the writing process based on the remaining battery level B of the terminals and the completion time $C_W$ of the file writing process; however, this is not a limitation.

For example, when the write request is accepted from a user, the terminal 201-$k$ may select the terminal to execute the file writing process based on the remaining battery level B of the terminals. In this case, the terminal 201-$k$ can select a terminal having the lowest possible probability of running out of battery power during execution of the file writing process as the terminal to be assigned the writing process. As a result, the battery can be prevented from running out during execution of the file writing process.

For example, when the write request is accepted from a user, the terminal 201-$k$ may select the terminal to execute the file writing process based on the completion time $C_W$ of the file writing process. In this case, the terminal 201-$k$ can select a terminal having the shortest possible completion time $C_W$ for completing the writing process as the terminal to be assigned the writing process. As a result, the processing time of the file writing process can be reduced.

An example of a file sharing system according to a third embodiment will be described. The third embodiment will be described by taking, as an example, a case of executing a file reading process as the shared process of a file to be shared. The file reading process is a process to collect distributed division data and restore the file to be shared. Portions identical to those described in the first and second embodiments will not be described.

An example of a file sharing system according to the third embodiment will be described with reference to FIG. 2. The terminals 201-$k$ have setting of a restoration speed at which the division data divided from the file to be shared is restored when the file reading process of the file to be shared is executed and a reading speed of the storage included in the terminals 201-$k$.

The terminal 201-$k$ executes the following processes after setting the file sharing group and until accepting a termination request for the file sharing from a user and terminating the file sharing. First, the terminal 201-$k$ acquires values of various parameters used for calculation of an evaluation value of the terminals 201-1 to 201-$m$ and registers the values into a file sharing group database (DB). The evaluation value acts as an index for selecting a terminal to be assigned the file reading process.

For example, the various parameters are the communication speed to between the terminal 201-$k$ and the other terminals, the remaining battery level B of the terminals 201-1 to 201-$m$, and a reading speed of the storages of the terminals 201-1 to 201-$m$. The file sharing group DB will be described later in detail with reference to FIG. 16.

When accepting from a user, a read request for the file to be shared, the terminal 201-$k$ calculates the evaluation value from the values of the various parameters registered in the file sharing group DB and selects the terminal having the highest evaluation value as the terminal to be assigned the reading process. The terminal 210-$k$ assigns the file reading process to the selected terminal.

Assigning the file reading process means causing the terminal to execute the file reading process. For example, if the terminal 201-1 accepting the read request for the file has the highest evaluation value, the terminal 201-1 executes the reading process. On the other hand, if a terminal different from the terminal 201-1 accepting the read request for the file has the highest evaluation value, the terminal 201-1 transmits a process request for the file reading process to the terminal having the highest evaluation value. The terminal accepting the process request executes the file reading process.

A calculation example of the completion time of the file reading process of a file to be shared will be described on the assumption that the terminals 201-1 to 201-3 form a file sharing group in the file sharing system 200. The completion time of the file reading process is the time consumed after a read request is made from a user until completion of the file reading process. By way of example, the terminal 201-1 accepts a read request from a user in the example of this description.

Figure 15:
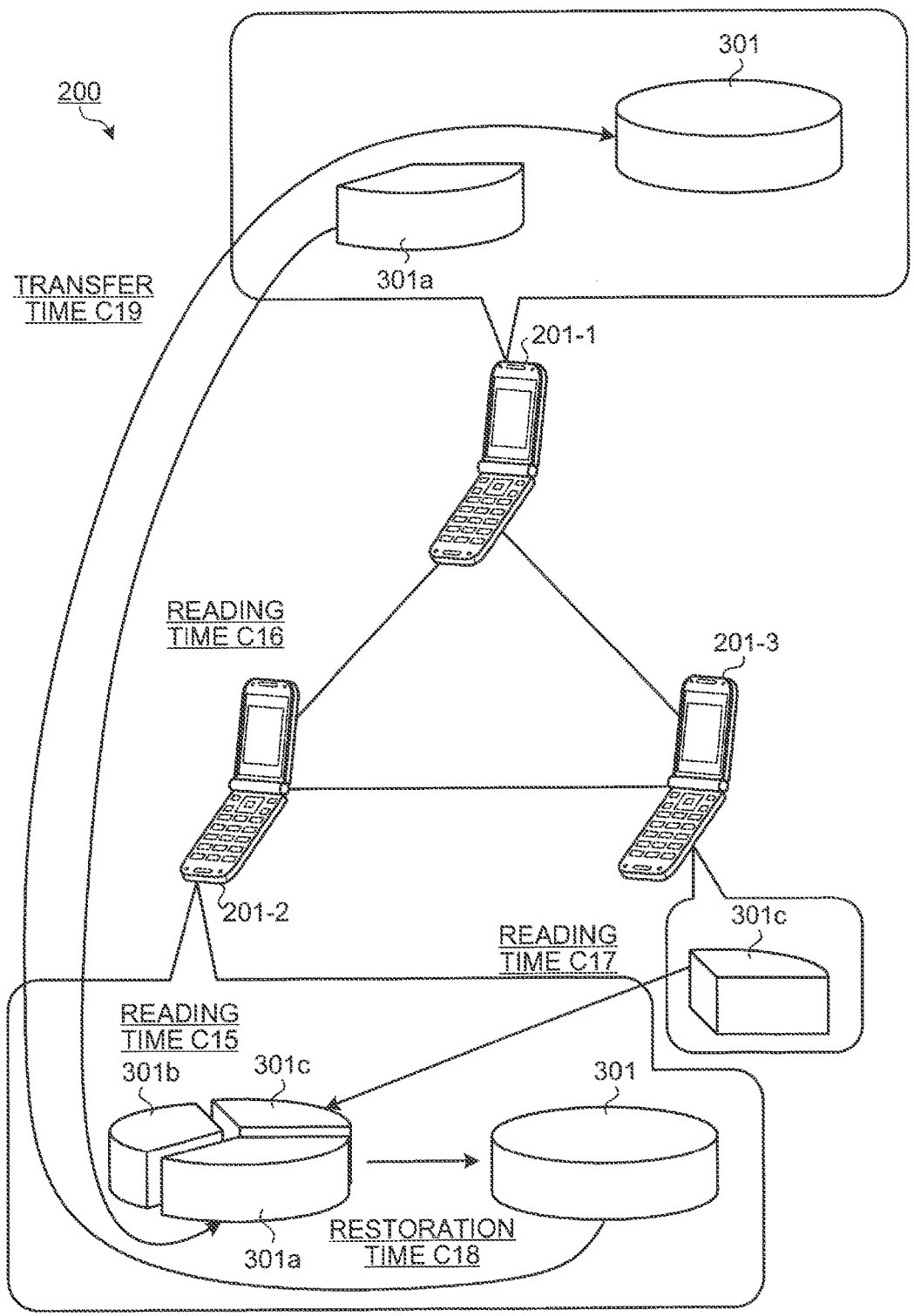

FIGS. 14 and 15 are explanatory views of a calculation example of the completion time of the file reading process of a file to be shared. Description will be made of the calculation example of the completion time of the reading process (referred to as "completion time $C_R$ of the terminal 201-1" in this example) when the terminal 201-1 accepting a read request for the file 301 to be shared from a user executes the file reading process with reference to FIG. 14.

In FIG. 14, the completion time $C_R$ of the terminal 201-1 is calculated from a reading time C11, a reading time C12, a reading time C13, and a restoration time C14. The reading time C11 is the time consumed for reading the division data 301$a$ by the terminal 201-1 from the storage of the terminal 201-1.

The reading time C12 is the total time of the time consumed for reading the division data 301$b$ by the terminal 201-2 from the storage of the terminal 201-2 and the time consumed for transferring the division data 301$b$ from the terminal 201-2 to the terminal 201-1. In other words, the reading time C12 is the time consumed for reading the division data 301$b$ from the terminal 201-2 and transferring the division data 301$b$ from the terminal 201-2 to the terminal 201-1.

The reading time C13 is the total time of the time consumed for reading the division data 301$c$ by the terminal 201-3 from the storage of the terminal 201-3 and the time consumed for transferring the division data 301$c$ from the terminal 201-3 to the terminal 201-1. In other words, the reading time C13 is the time consumed for reading the division data 301$c$ from the terminal 201-3 and transferring the division data 301$c$ from the terminal 201-3 to the terminal 201-1.

The restoration time C14 is the time consumed for restoring the division data 301$a$ to 301$c$ collected by the terminal 201-1 into the file 301 to be shared.

The completion time $C_R$ of the terminal 201-1 is calculated based on the total time of the reading time C11 and the restoration time C14, the total time of the reading time C12 and the restoration time C14, and the total time of the reading time C13 and the restoration time C14. For example, the terminal 201-1 calculates as the completion time $C_R$ of the terminal 201-1 the longest total time among the total time of the reading time C11 and the restoration time C14, the total time of the reading time C12 and the restoration time C14, and the total time of the reading time C13 and the restoration time C14.

With reference to FIG. 15, description will be made of the calculation example of the completion time of the reading process (referred to as "completion time $C_R$ of the terminal 201-2" in this example) when the terminal 201-1 accepts the reading request for the file 301 to be shared from a user and the terminal 201-2 executes the reading process.

In FIG. 15, the completion time $C_R$ of the terminal 201-2 is calculated from a reading time C15, a reading time C16, a reading time C17, a restoration time C18, and a transfer time C19. The reading time C15 is the time consumed for reading the division data 301$b$ by the terminal 201-2 from the storage of the terminal 201-2.

The reading time C16 is the total time of the time consumed for reading the division data 301$a$ by the terminal 201-1 from the storage of the terminal 201-1 and the time consumed for transferring the division data 301$a$ from the terminal 201-1 to the terminal 201-2. In other words, the reading time C16 is the time consumed for reading the division data 301$a$ from the terminal 201-1 and transferring the division data 301$a$ from the terminal 201-1 to the terminal 201-2.

The reading time C17 is the total time of the time consumed for reading the division data 301$c$ by the terminal 201-3 from the storage of the terminal 201-3 and the time consumed for transferring the division data 301$c$ from the terminal 201-3 to the terminal 201-2. In other words, the reading time C17 is the time consumed for reading the division data 301c from the terminal 201-3 and transferring the division data 301c from the terminal 201-3 to the terminal 201-2.

The restoration time C18 is the time consumed for restoring the division data 301a to 301c collected by the terminal 201-2 into the file 301 to be shared. The transfer time C19 is the time consumed for transferring the file 301 to be shared restored by the terminal 201-2 from the terminal 201-2 to the terminal 201-1.

The completion time $C_R$ of the terminal 201-2 is calculated based on the total time A4 of the reading time C15 and the restoration time C18, the total time A5 of the reading time C16 and the restoration time C18, the total time A6 of the reading time C17 and the restoration time C18, and the transfer time C19. For example, the terminal 201-1 calculates as the completion time $C_R$ of the terminal 201-2 the longest total time among the total time of the total time A4 and the transfer time C19, the total time of the total time of the total time A5 and the transfer time C19, and the total time of the total time A6 and the transfer time C19.

Contents of the file sharing group DB will be described. The contents will be described by taking a file sharing group DB 1600 included in the terminal 201-1 as an example.

Figure 16:
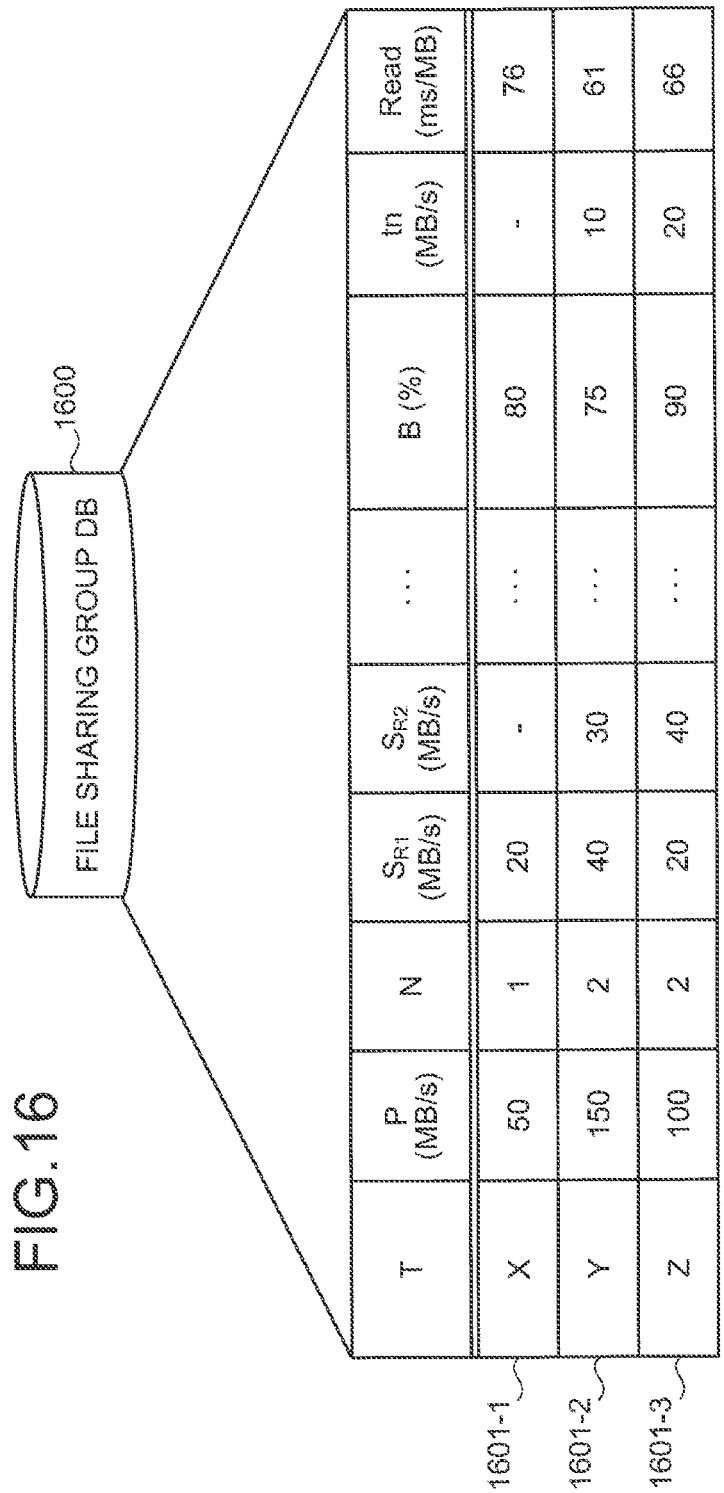
FIG. 16 is an explanatory view of an example of the contents of the file sharing group DB.

FIG. 16 is an explanatory view of an example of the contents of the file sharing group DB. In FIG. 16, the file sharing group DB 1600 included in the terminal 201-1 has fields of the terminal name T, a restoration speed P, the storage number N, a reading speed $S_R$, the remaining battery level B, the communication speed tn, and a unit reading time Read. By setting information into the fields, terminal characteristic data 1601-1 to 1601-m are stored as records.

The file sharing group DB 1600 has a record for the terminal 201-1 having the file sharing group DB 1600 stored as first terminal characteristic data 601-1. Records for the other terminals are stored as the second and subsequent terminal characteristic data 601-2 to 601-m. The terminals 210-1 to 201-3 form a file sharing group in this example.

The restoration speed P is the data size restored per unit time when the division data divided from the file to be shared is restored, and is in [MB/s]. The restoration speed P is determined according to the CPU performance of the terminals 201-1 to 210-3. In the following description, the restoration speed P corresponding to the terminal name T is described as a "restoration speed $P_T$". For example, a restoration speed $P_X$ refers to the restoration speed P of the terminal 201-1 having the terminal name T of "X".

The reading speed $S_R$ is the data size read per unit time when the division data divided from the file to be shared is read from storage, and is in [MB/s]. The reading speed $S_R$ is registered depending on attachment/detachment of the mobile storage for each storage. In the following description, the reading speed $S_R$ corresponding to the terminal name T is described as a "reading speed $S_{RT}$". For example, a reading speed $S_{RX}$ refers to the reading speed $S_R$ of the terminal 201-1 having the terminal name T of "X".

In the following description, the reading speed $S_R$ corresponding to an i-th storage of each terminal is described as a "reading speed $S_{Ri}$". For example, a reading speed $S_{R1}$ refers to the reading speed $S_R$ of a first storage. Therefore, a reading speed $S_{RX1}$ refers to the reading speed $S_R$ of the first storage of the terminal 201-1 having the terminal name T of "X". In this example, an internal storage is the first storage and a mobile storage is a second or subsequent storage.

The unit reading time Read is a reading process time per unit data size of each terminal and is in [ms/MB]. The reading process time is a time from start of execution of a reading process by each terminal until completion and is, for example, the time consumed for collecting the distributed division data and completing the restoration of the file to be shared from the collected division data. Therefore, by multiplying the unit reading time Read by the data size of the file to be shared, the time can be calculated that is consumed from the start of execution of the file reading process of the file to be shared by a corresponding terminal until completion.

A terminal calculates and registers the unit reading time Read corresponding to the terminal at predetermined intervals. The unit reading time Read corresponding to the other terminals is acquired from the other terminals and registered when a read request is accepted from a user. In the following description, the unit reading time Read corresponding to the terminal name T is described as a "unit reading time $Read_T$". For example, a unit reading time $Read_X$ refers to the unit reading time Read of the terminal 201-1 having the terminal name T of "X".

By way of example, taking the terminal characteristic data 1601-2 as an example, the stored data are the terminal name T of "Y", the restoration speed $P_Y$=150 [MB/s], the storage number $N_Y$=2 [units], the reading speed $S_{RY1}$=40 [MB/s], the reading speed $S_{RY2}$=30 [MB/s], the remaining battery level $B_Y$=75 [%], the communication speed $tn_{XY}$=10 [MB/s], and the unit reading time $Read_Y$=61 [ms/MB].

An example of functions of the terminal according to the third embodiment will be described with reference to FIG. 7. The selecting unit 702 selects a terminal to execute a file reading process among the terminals 201-1 to 201-m. For example, the selecting unit 702 selects as the terminal to execute a file reading process, a terminal having the largest remaining battery level B acquired by the acquiring unit 701 or one of terminals having a remaining battery level B greater than or equal to a predetermined value.

As a result, the selecting unit 702 can select as a terminal to execute the file reading process, a terminal having the lowest probability of running out of battery power during the file reading process among the terminals 201-1 to 210-m.

The assigning unit 703 assigns a file reading process to the terminal selected by the selecting unit 702. For example, if the terminal of the assigning unit 703 is selected, the assigning unit 703 assigns the file reading process to the terminal. As a result, the terminal 201-k executes the file reading process. If another terminal is selected, the assigning unit 703 transmits a process request for the file reading process to the other terminal. As a result, the terminal receiving the process request executes the file reading process.

The acquiring unit 701 acquires information for calculating the completion time of the file reading process. As described above, the completion time of the file reading process includes a collection time for collecting the distributed division data from multiple terminals, a restoration time for restoring the file to be shared from the division data, and a transfer time for transferring the file from the terminal to execute the file reading process. Collecting the division data is to read the division data from the storage of the terminals and transfer the read division data from the terminals to the terminal to execute the reading process.

The information for calculating the completion time includes, for example, the data size of the file to be shared, the restoration speed P of the file to be shared at each terminal, the reading speed $S_{Ri}$ of the division data from the storage in each terminal, and the communication speed to between the terminal and the other terminals.

For example, the acquiring unit 701 acquires the restoration speed P of data of the terminal thereof, from the file sharing group DB (see, e.g., FIG. 16). For example, the restoration speed P of data of the terminal thereof is preset at the time of manufacture and registered in the file sharing group DB.

For example, when starting sharing of a file, the acquiring unit 701 acquires the restoration speed P of the other terminals from the other terminals. For example, the acquiring unit 701 reads data of a minute size (e.g., several bits) from the storage of the terminal thereof and measures a time from the start of reading of the data until completion to acquire the reading speed $S_{Ri}$ of the terminal thereof. The acquired reading speed $S_{Ri}$ of the terminal thereof is registered in the file sharing group DB, for example.

For example, when starting sharing of a file, the acquiring unit 701 acquires the reading speed $S_{Ri}$ of the other terminals from the other terminals. The acquired reading speed $S_{Ri}$ of the other terminals is registered in the file sharing group DB, for example. The reading speeds $S_{Ri}$ of the terminal thereof and the other terminals are acquired each time storage of the terminal thereof and the other terminals is attached/detached, for example.

The calculating unit 704 calculates the completion time $C_R$ of the file reading process at each terminal based on the information acquired by the acquiring unit 701. For example, the calculating unit 704 uses information acquired by the acquiring unit 701 and a predetermined equation to calculate the completion time $C_R$ of the file reading process in each terminal.

In the following description, if a terminal having the terminal name T of "T1" accepts a read request for a file from a user, the completion time $C_R$ of the file reading process corresponding to a terminal having the terminal name T of "T2" is described as a "completion time $C_{RT1T2}$". For example, a completion time $C_{RXY}$ refers to the completion time $C_R$ when a terminal having the terminal name T of "X" accepts a read request for a file from a user and a terminal having the terminal name T of "Y" executes the reading process.

The completion time $C_R$ calculated by the calculating unit 704 will be described by taking a file sharing group corresponding to the file sharing group DB 1600 depicted in FIG. 16 as an example. For example, the calculating unit 704 can use Equation (6) to calculate a completion time $C_{RXX}$ when a terminal X accepting a read request from a user assigns a reading process to the terminal X.

In Equation (6), $S_{Rxi}$ is a parameter indicative of the reading speed $S_R$ of the i-th storage of the terminal X. $S_{RYi}$ is a parameter indicative of the reading speed $S_R$ of the i-th storage of the terminal Y. $S_{RZi}$ is a parameter indicative of the reading speed $S_R$ of the i-th storage of the terminal Z.

$$C_{RXX} = \operatorname{Max}\left\{\begin{array}{l}\sum_{i=1}^{N_X}\frac{F}{N}/S_{RXi}, \sum_{i=1}^{N_Y}\frac{F}{N}/S_{RYi}+ \\ \frac{N_Y F}{N}/tn_{XY}, \sum_{i=1}^{N_Z}\frac{F}{N}/S_{RZi}+ \\ \frac{N_Z F}{N}/tn_{XZ}\end{array}\right\} + F/P_X \quad (6)$$

$$= F\times\left[\operatorname{Max}\left\{\begin{array}{l}\sum_{i=1}^{N_X}\frac{1}{N}/S_{RXi}, \sum_{i=1}^{N_Y}\frac{1}{N}/S_{RYi}+ \\ \frac{N_Y}{N}/tn_{XY}, \sum_{i=1}^{N_Z}\frac{1}{N}/S_{RZi}+ \\ \frac{N_Z}{N}/tn_{XZ}\end{array}\right\} + 1/P_X\right]$$

$$= F\times\operatorname{Read}_X$$

Therefore, the calculating unit 704 can substitute the values of the various parameters described above in Equation (6) to calculate the completion time $C_{RXX}$ when the terminal X accepting the read request for the file from a user executes the reading process.

Elements in parentheses of the equation on the first line of Equation (6) are the time of reading the distributed division data from the terminal thereof, and the time from the start of reading of the division data from the storage of the other terminals until completion of transfer of the division data to the terminal to execute the reading process. Since the reading and transfer of the division data to the terminal to execute the reading process are concurrently performed in the respective terminals, a maximum value in parentheses is used for calculating a processing time of the process having the longest processing time. In the equation on the first line of Equation (6), a second element indicates the time for restoring the file to be shared from the collected division data.

In Equation (6), the equation on the second line is acquired by developing the equation on the first line with F and the equation on the third line is acquired by replacing the elements in parentheses of the equation on the second line with the unit reading time $\operatorname{Read}_X$. Equation (6) enables the calculation of the completion time $C_{RXX}$ from when the terminal X accepting the read request from a user collects the divided division data until completing the restoration of the file to be shared from the collected division data.

In the example of the file sharing group DB 1600 depicted in FIG. 16, the values of the various parameters are as follows: F=12 [MB]; $P_X$=50 [MB/s]; N=5 [units]; $N_X$=1 [piece]; $N_Y$=2 [units]; $N_Z$=2 [units]; $S_{RX1}$=20 [MB/s]; $S_{RY1}$=40 [MB/s]; $S_{RY2}$=30 [MB/s]; $S_{RZ1}$=20 [MB/s]; $S_{RZ2}$=40 [MB/s]; $tn_{XY}$=10 [MB/s]; and $tn_{XZ}$=20 [MB/s].

In this case, the calculating unit 704 can substitute the values of the various parameters in Equation (6) to calculate the unit reading time $\operatorname{Read}_X$=76 [ms/MB] and the completion time $C_{RXY}$=0.9 [s].

Another terminal can use the equation same as Equation (6) to calculate the completion time $C_R$ when the terminal accepting the read request from a user executes the reading process. For example, when the terminal Y accepting the read request from a user executes the reading process, the completion time $C_{RYY}$ is calculated by the terminal Y substituting the values of the various parameters in an equation acquired by replacing X with Y in Equation (6).

For example, the calculating unit 704 can use Equation (7) to calculate a completion time $C_{RXY}$ when the terminal X accepting a read request from a user assigns a file reading process to the terminal Y.

$$C_{RXY} = C_{RYY} + F/tn_{XY} \quad (7)$$

$$= F\times\operatorname{Read}_Y + F/tn_{XY}$$

Therefore, the calculating unit 704 can substitute the values of F, $tn_{XY}$, and $\operatorname{Read}_Y$ in Equation (7) to calculate the completion time $C_{RXY}$. In the equation on the first line of Equation (7), a first element is the completion time $C_{RYY}$ consumed from the start of the reading process by the terminal Y until completion, and a second element is a time for transferring the restored file to be shared from terminal Y to the terminal X. A second element of the equation on the second line of Equation (7) is acquired by factorizing the completion time $C_{RYY}$ as in Equation (6).

For example, if the values of the various parameters are F=12 [MB], $tn_{XY}$=10 [MB/s], and $Read_Y$=61 [ms/MB], the completion time $C_{RXY}$ is 2.1 [s].

Another terminal can use the equation same as Equation (7) to calculate the completion time $C_R$ when a terminal different from a terminal accepting the read request from a user executes the reading process. For example, when the terminal Z different from the terminal Y accepting the read request from a user executes the reading process, the completion time $C_{RYZ}$ is calculated by the terminal Y substituting the values of the various parameters in an equation acquired by replacing X and Y with Y and Z, respectively, in Equation (7).

The selecting unit 702 may select a terminal to execute the file reading process, based on a calculation result from the calculating unit 704. For example, the selecting unit 702 selects the terminal having the shortest calculated completion time $C_R$ of the file reading process as the terminal to execute the file reading process. For example, if the terminal X accepts the read request for the file from a user, the selecting unit 702 selects the terminal corresponding to the shortest completion time among the completion time $C_{RXX}$, the completion time $C_{RXY}$, and the completion time $C_{RXZ}$ as the terminal to be assigned the reading process.

As a result, the selecting unit 702 can select the terminal having the shortest completion time $C_R$ of the file reading process as the terminal to execute the file reading process among the terminals 201-1 to 201-m.

The calculating unit 704 may calculate an evaluation value (hereinafter, referred to as an "evaluation value $V_R$") used as an index for selecting the terminal to be assigned the file reading process based on the remaining battery level B and the completion time $C_R$ of the file reading process. In the following description, when the terminal X accepts the read request from a user, the evaluation value $V_R$ of the terminal X is described as "$V_{RXX}$". If the terminal X accepts the read request from a user, the evaluation value $V_R$ of the terminal Y is described as "$V_{RXY}$".

The evaluation value $V_R$ calculated by the calculating unit 704 will be described by taking a file sharing group corresponding to the file sharing group DB 1600 depicted in FIG. 16 as an example. For example, the calculating unit 704 can use any of equations acquired by replacing W with R in Equations (3) to (5) to calculate the evaluation value $V_{RXX}$ of the terminal X when the terminal X accepts the read request from a user.

Therefore, the calculating unit 704 can substitute the values of $B_X$ and $C_{RXX}$ in any of the equations acquired by replacing W with R in Equations (3) to (5) to calculate the evaluation value $V_{RXX}$ of the terminal X when the terminal X accepts the read request from a user. In any of the equations acquired by replacing W with R in Equations (3) to (5), the larger the remaining battery level B is and the shorter the completion time $C_R$ is, the higher the calculated evaluation value $V_R$ is.

Another terminal can use the equations same as the equations acquired by replacing W with R in Equations (3) to (5) to calculate the evaluation value $V_R$. For example, when the terminal X accepts the read request for the file, the evaluation value $V_{RXY}$ of the terminal Y can be calculated by using the equations acquired by replacing $B_X$ and $C_{RXX}$ with $B_Y$ and $C_{RXY}$, respectively, in the equations acquired by replacing W with R in Equations (3) to (5).

In this case, the selecting unit 702 may select the terminal to execute the file reading process among the terminals 201-1 to 201-m based on the evaluation value $V_R$ calculated by the calculating unit 704. For example, the selecting unit 702 selects the terminal having the highest evaluation value $V_R$ calculated by the calculating unit 704 as the terminal to execute the file reading process.

As a result, the selecting unit 702 can select as the terminal to execute the file reading process a terminal having the lowest possible probability of running out of battery power during the file reading process and having the shortest possible completion time $C_R$ of the file reading process among the terminals 201-1 to 210-m.

An example of a process procedure executed by the terminal 201-k will hereinafter be described.

FIG. 17 is a flowchart of an example of a procedure of the file sharing setting process of the terminal according to the third embodiment. The file sharing setting process is a process executed by the CPU 501. In the file sharing setting process, the terminal 201-k determines whether a start request for file sharing has been accepted from a user (step S1701) and, if not (step S1701: NO), the terminal 201-k waits until the acceptance.

At step S1701, when the start request for file sharing has been accepted from a user (step S1701: YES), the acquiring unit 701 acquires values of various parameters (step S1702). The various parameters are static parameters and are the restoration speed P and the reading speed $S_R$ in the other terminals, for example. The terminal 201-k registers the acquired values of the various parameters into the file sharing group DB included in the terminal 201-k (step S1703).

The terminal 201-k then determines whether a termination request for file sharing has been accepted from a user (step S1704). If the termination request for file sharing has not been accepted from a user (step S1704: NO), the acquiring unit 701 executes the communication speed collection process (see FIG. 9) (step S1705).

The acquiring unit 701 then acquires the remaining battery level B of the terminal 201-k from the PMU 507 (step S1706). The terminal 201-k registers the acquired remaining battery level B of the terminal 201-k into the file sharing group DB (step S1707). The terminal 201-k determines whether a change notification of a mobile storage indicative of detection of insertion/removal of the mobile storage has been received from another terminal (step S1708). If the change notification of a mobile storage has not been received (step S1708: NO), the terminal 201-k goes to step S1710.

At step S1708, if the change notification of a mobile storage has been received (step S1708: YES), the terminal 201-k registers details of the change into the file sharing group DB (step S1709). For example, the terminal 201-k updates and registers the reading speed of the storage detected as being inserted/removed. The calculating unit 704 then calculates the unit reading time Read of the terminal 201-k (step S1710).

The terminal 201-k registers the calculated unit reading time Read of the terminal 201-k into the file sharing group DB (step S1711) and goes to step S1704. If the termination request for file sharing has been accepted from a user (step S1704: YES), the terminal 201-k terminates a sequence of the process of this flowchart.

FIG. 18 is a flowchart of an example of a procedure of the storage insertion/removal detection process of the terminal according to the third embodiment. The storage insertion/removal detection process is a process executed by the CPU

501. In the storage insertion/removal detection process, the terminal 201-$k$ determines whether insertion/removal of a mobile storage has been detected (step S1801) and, if not (step S1801: NO), the terminal 201-$k$ waits until the detection.

At step S1801, when the insertion/removal of a mobile storage has been detected (step S1801: YES), the terminal 201-$k$ determines whether the mobile storage is available (step S1802). In this way, the terminal 201-$k$ determines whether the mobile storage is attached.

At step S1802, if the mobile storage is not available (step S1802: NO), the terminal 201-$k$ goes to step S1804. If the mobile storage is available (step S1802: YES), the acquiring unit 701 measures the reading speed $S_{Ri}$ of the mobile storage (step S1803).

The terminal 201-$k$ updates the file sharing group DB (step S1804). If the mobile storage is available at step S1802, the terminal 201-$k$ updates the reading speed $S_{Ri}$ measured at step S1803 in the file sharing group DB. If the mobile storage is not available at step S1802, the terminal 201-$k$ deletes the reading speed $S_{Ri}$ corresponding to the mobile storage from the file sharing group DB.

The terminal 201-$k$ then transmits a mobile storage change notification including the information of the reading speed $S_{Ri}$ corresponding to the mobile storage to the other terminals to make a notification of a change in the mobile storage (step S1805) and terminates a sequence of the process of this flowchart.

FIG. 19 is a flowchart of an example of a read request acceptance process procedure of the terminal according to the third embodiment. The read request acceptance process is a process executed by the CPU 501. In the read request acceptance process, the terminal 201-$k$ determines whether a read request for a file to be shared has been accepted from a user (step S1901) and, if not (step S1901: NO), the terminal 201-$k$ waits until the acceptance.

At step S1901, if a read request for a file to be shared has been accepted from a user (step S1901: YES), the acquiring unit 701 acquires the unit reading time Read and the remaining battery level B of the other terminals (step S1902). The terminal 201-$k$ then registers the acquired unit reading time Read and remaining battery level B into the file sharing group DB (step S1903).

After step S1903, the calculating unit 704 executes the evaluation value calculation process (see FIG. 12) of calculating the completion time $C_R$ and the evaluation value $V_R$ (step S1904). The assigning unit 703 executes a reading assignment process (see FIG. 20) of assigning the reading process to a terminal (step S1905).

After step S1905, the terminal 201-$k$ determines whether the file reading process has been completed (step S1906). The completion of the file reading process means that the terminal 201-$k$ receives the file restored from the division data from another terminal assigned the file reading process. If the reading process is assigned to the terminal 201-$k$, the completion of the reading process is completion of restoration of the file to be shared from the division data.

At step S1906, if the file reading process has been completed (step S1906: YES), the terminal 201-$k$ terminates a sequence of the process of this flowchart. If the file reading process has not been completed (step S1906: NO), the terminal 201-$k$ determines whether a fault has been detected (step S1907). For example, the terminal 201-$k$ detects a fault such as removal of the mobile storage during reading of the division data divided from the file to be shared.

If a fault has been detected (step S1907: YES), the terminal 201-$k$ executes an error process (step S1908) and terminates a sequence of the process of this flowchart.

At step S1907, if no fault has been detected (step S1907: NO), the terminal 201-$k$ goes to step S1906.

FIG. 20 is a flowchart of an example of a procedure of the reading assignment process of the terminal according to the third embodiment. In the reading assignment process, the terminal 201-$k$ refers to the evaluation value $V_R$ calculated in the evaluation value calculation process (step S2001). The selecting unit 702 selects the terminal to execute the reading process (step S2002). In this case, for example, the selecting unit 702 selects the terminal having the highest evaluation value as the terminal to execute the reading process.

The terminal 201-$k$ then determines whether the terminal selected at step S2002 is the terminal 201-$k$ (step S2003). If the selected terminal is the terminal 201-$k$ (step S2003: YES), the terminal 201-$k$ starts executing the reading process (step S2004) and terminates a sequence of the process of this flowchart. In this case, for example, the terminal 201-$k$ causes the terminals to read the division data from the storages thereof, collects the read division data, and restores the file to be shared from the collected division data.

If the terminal selected at step S2002 is another terminal (step S2003: NO), the assigning unit 703 transmits the read request to the selected terminal (step S2005) and terminates a sequence of the process of this flowchart.

The terminal 201-$k$ according to the third embodiment described above can select the terminal to be assigned the file reading process based on the remaining battery level B of the terminals sharing the file and the completion time $C_R$ of the file reading process. In other words, the terminal to execute the file reading process can be selected by comprehensively evaluating the remaining battery level B of the terminals, the processing performance, and the communication status between terminals.

Therefore, the terminal 201-$k$ can select a terminal having the lowest possible probability of running out of battery power during execution of the file reading process and having the shortest possible completion time $C_R$ for completing the reading process as the terminal to be assigned the reading process. As a result, the battery can be prevented from running out during execution of the file reading process and the processing time of the file reading process can be reduced.

In the third embodiment, when the read request for the file is accepted from a user, the terminal 201-$k$ selects the terminal to execute the reading process based on the remaining battery level B of the terminals and the completion time $C_R$ of the file reading process; however, this is not a limitation.

For example, when the read request is accepted from a user, the terminal 201-$k$ may select the terminal to execute the file reading process, based on the remaining battery level B of the terminals. In this case, the terminal 201-$k$ can select a terminal having the lowest possible probability of running out of battery power during execution of the file reading process as the terminal to be assigned the reading process. As a result, the battery can be prevented from running out during execution of the file reading process.

For example, when the read request is accepted from a user, the terminal 201-$k$ may select the terminal to execute the file reading process, based on the completion time $C_R$ of the file reading process. In this case, the terminal 201-$k$ can select a terminal having the shortest possible completion time $C_R$ for completing the reading process as the terminal to be assigned the reading process. As a result, the processing time of the file reading process can be reduced.

The file sharing method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A file sharing method executed by a first terminal, the file sharing method comprising:
    determining evaluation values for each terminal of a plurality of terminals based on a remaining battery level of the plurality of terminals and a processing time of a shared process;
    selecting from among the plurality of terminals including the first terminal and based on results of a comparison of the evaluation values, a second terminal to execute the shared process for sharing a plurality of files among the plurality of terminals;
    assigning the shared process to the second terminal; and
    causing the second terminal to execute the shared process if a communication speed between the plurality of terminals is at least equal to a threshold, otherwise causing the second terminal to execute the shared process after the communication speed becomes at least equal to the threshold, the shared process including a dividing process for division of a first file into the plurality of files, wherein the second terminal executing the shared process comprises the second terminal writing a second file of the plurality of files.

2. The file sharing method according to claim 1, wherein the shared process includes restoring process for restoration of the files.

3. The file sharing method according to claim 1, comprising
    acquiring the remaining battery level when the plurality of files are accessed.

4. The file sharing method according to claim 1, comprising
    registering parameters and the remaining battery levels related to the plurality of terminals into a shared database of the plurality of terminals.

5. The file sharing method according to claim 1, comprising calculating the processing time, based on parameters including at least one of a size of the plurality of files, a dividing process speed of the plurality of files, a restoring process speed of the plurality of files, a reading speed from a first storage built into the plurality of terminals, a writing speed into the first storage, a reading speed from a s second storage attached to and detached from the plurality of terminals, a writing speed into the second storage, the communication speed between the plurality of terminals, and a count of the plurality of terminals.

6. The file sharing method according to claim 1, comprising
    comparing the communication speed between the plurality of terminals and the threshold, based on a write request for the plurality of files; and
    writing data corresponding to the write request into a storage of the first terminal, when the communication speed is less than the threshold.

7. The file sharing method according to claim 6, comprising
    writing the data into the plurality of files, when the communication speed becomes at least equal to the threshold.

8. A first terminal that is included in a plurality of terminals, the first terminal comprising:
    a memory;
    a processor coupled to the said memory storing instructions executed by the processor to:
    store a first file to be shared by the plurality of terminals including the first terminal;
    determine evaluation values for each terminal of the plurality of terminals based on a remaining battery level of the plurality of terminals and a processing time of a shared process;
    select from among the plurality of terminals including the first terminal, a second terminal to execute the shared process for sharing the plurality of files among the plurality of terminals, based on results of a comparison of the evaluation values;
    assign the shared process to the second CPU terminal; and
    causing the second terminal to execute the shared process if a communication speed between the plurality of terminals is at least equal to a threshold, and otherwise causing the second terminal to execute the shared process after the communication speed becomes at least equal to the threshold, the shared process including a dividing process for division of the first file into the plurality of files, wherein the second terminal executing the shared process comprises the second terminal writing a second file of the plurality of files.

9. The first terminal according to claim 8, wherein the first terminal is configured to register parameters related to the plurality of terminals and the remaining battery level of the plurality of terminals.

10. The first terminal according to claim 8, wherein
    the first terminal is configured to calculate the processing time based on parameters including at least one of a size of the plurality of files, a dividing process speed of the plurality of files, a restoring process speed of the plurality of files, a reading speed from a first storage unit into the plurality of terminals, a writing speed into the first storage, a reading speed from a second storage attached to and detached from the plurality of terminals, a writing speed into the second storage, the communication speed between the plurality of terminals, and a count of the plurality of terminals.

* * * * *